US011283121B1

(12) United States Patent
Boecker et al.

(10) Patent No.: US 11,283,121 B1
(45) Date of Patent: Mar. 22, 2022

(54) BATTERY THERMAL MITIGATION USING COOLANT

(71) Applicant: Zoox, Inc., Foster City, CA (US)

(72) Inventors: Moritz Boecker, Millbrae, CA (US); Justin Michael Russell, San Jose, CA (US); Robert Alan Ng, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 224 days.

(21) Appl. No.: 16/698,800

(22) Filed: Nov. 27, 2019

(51) Int. Cl.
| H01M 10/65 | (2014.01) |
| H01M 10/6554 | (2014.01) |
| H01M 10/625 | (2014.01) |
| H01M 10/613 | (2014.01) |
| H01M 10/6552 | (2014.01) |
| H01M 50/20 | (2021.01) |
| H01M 50/24 | (2021.01) |

(52) U.S. Cl.
CPC ..... *H01M 10/6554* (2015.04); *H01M 10/613* (2015.04); *H01M 10/625* (2015.04); *H01M 10/6552* (2015.04); *H01M 50/20* (2021.01); *H01M 50/24* (2021.01)

(58) Field of Classification Search
None
See application file for complete search history.

(56) References Cited

U.S. PATENT DOCUMENTS

| 4,672,010 A | 6/1987 | Tucholski et al. |
| 6,969,567 B1 | 11/2005 | Higley et al. |
| 9,919,591 B2 | 3/2018 | Mizoguchi et al. |
| 10,347,894 B2 | 7/2019 | Barton et al. |
| 2004/0036444 A1 | 2/2004 | Oogami |
| 2005/0202311 A1 | 9/2005 | Higashino et al. |

(Continued)

FOREIGN PATENT DOCUMENTS

| JP | 2016-018637 | * | 2/2016 |
| JP | 2016-092007 | * | 5/2016 |

(Continued)

OTHER PUBLICATIONS

Office Action for U.S. Appl. No. 16/698,841, dated Jun. 23, 2021, Boecker, "Battery Thermal Mitigation Venting", 10 pages.

*Primary Examiner* — Lisa S Park
(74) *Attorney, Agent, or Firm* — Lee & Hayes, P.C.

(57) ABSTRACT

A battery pack for a vehicle electrical system includes a casing for receiving one or more battery modules. The battery modules are insertable into a casing of the battery pack. Additionally, the battery modules may include cooling plate to cool the battery module and provide coolant to another battery module in response to a triggering event. Additionally, the battery modules may include a top cover with a frangible insulating material to further thermally insulate one battery module from another battery module and allow gasses and active material to escape the battery module in response to a triggering event. The battery pack may additionally be configured with vents for venting the gases and active material, such as those generated by a battery module in a thermal runaway event. Additionally, the battery modules may include a heat shield to direct vented gases and active material away from a cabin of a vehicle.

20 Claims, 10 Drawing Sheets

(56) References Cited

U.S. PATENT DOCUMENTS

| | | | |
|---|---|---|---|
| 2010/0273034 A1* | 10/2010 | Hermann | B60K 1/04 |
| | | | 429/62 |
| 2012/0263982 A1 | 10/2012 | Yasui et al. | |
| 2013/0095356 A1 | 4/2013 | Shimizu et al. | |
| 2013/0316198 A1* | 11/2013 | Bandhauer | G08C 17/02 |
| | | | 429/50 |
| 2014/0004404 A1 | 1/2014 | Kinoshita et al. | |
| 2017/0373287 A1 | 12/2017 | Yamashita et al. | |
| 2019/0157636 A1 | 5/2019 | Miler et al. | |
| 2019/0348701 A1 | 11/2019 | Balogh et al. | |
| 2019/0355954 A1 | 11/2019 | Dawley | |

FOREIGN PATENT DOCUMENTS

| | | | |
|---|---|---|---|
| JP | 2017-111900 | * | 6/2017 |
| JP | 2018-055768 | * | 4/2018 |

* cited by examiner

BATTERY THERMAL MITIGATION USING COOLANT

BACKGROUND

Many vehicles in operation today are powered, at least in part, by electrical systems. To provide sufficient electricity to power an entire vehicle, the electrical system typically includes batteries configured with multiple cells. While battery technology is improving, batteries are still prone to failure. Under certain conditions, battery failure may lead to thermal runaway of one or more cells. The increase in the number of cells may increase a risk of a cell in thermal runaway propagating heat to nearby cells, triggering a chain reaction and causing additional cells to enter thermal runaway.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6A is perspective view of a laminated cooling plate configuration. FIG. 6B illustrates close-up views of example cross-sections of the cooling plates and cooling channels. FIG. 6C is a perspective view of an illustrative thermal runaway mitigation region formation technique.

DETAILED DESCRIPTION

Figure 1:
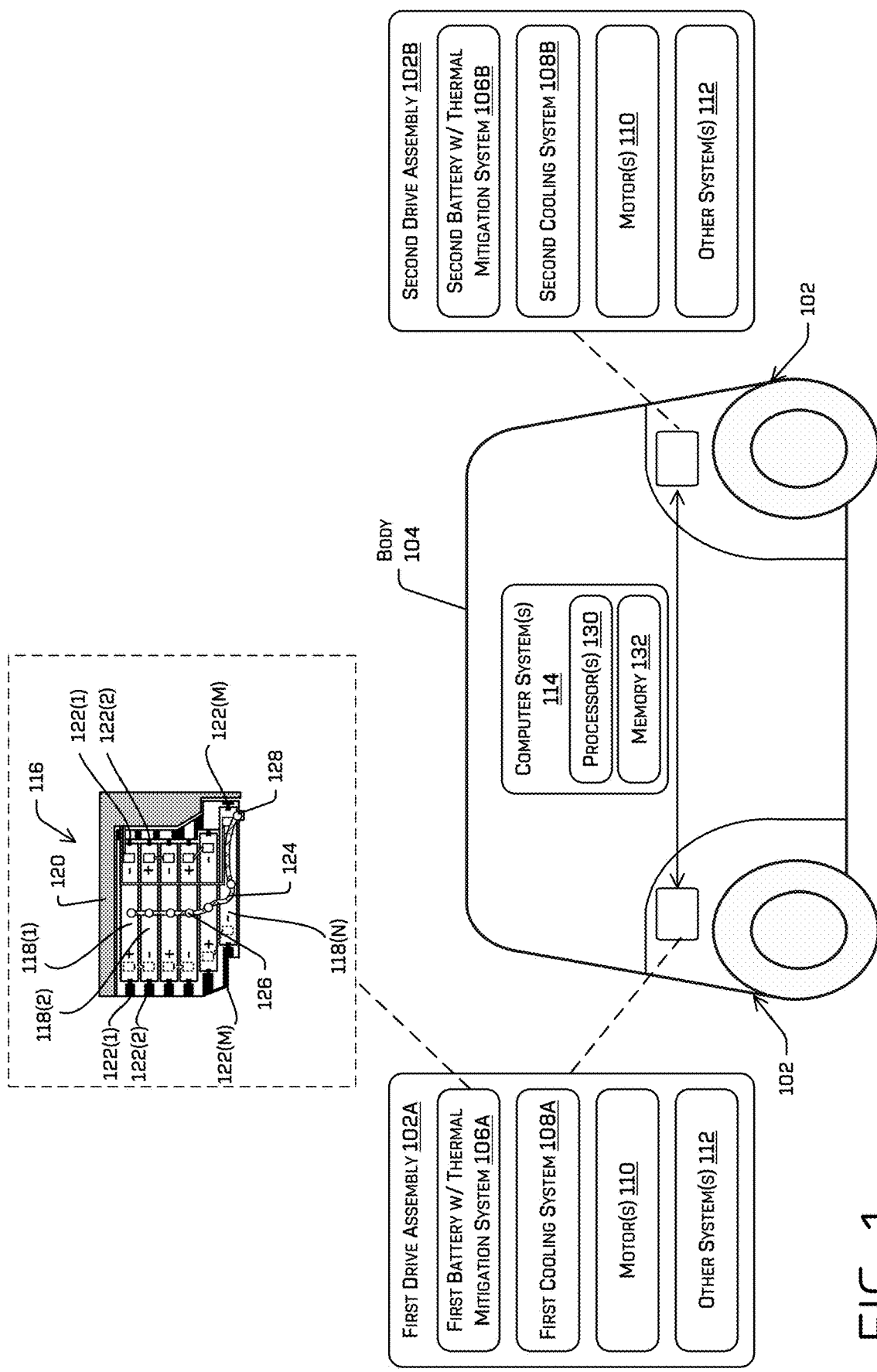
FIG. 1 is an illustration of an autonomous vehicle including one or more battery packs configured with thermal runaway mitigation systems, in accordance with embodiments of the disclosure.

As discussed above, while battery technology is improving, batteries are still prone to failure, and under certain conditions, may lead to thermal runaway of one or more cells. The increase in the number of cells may increase a risk of a cell in thermal runaway propagating heat to nearby cells, triggering a chain reaction and causing additional cells to enter thermal runaway.

This application relates to techniques for improving thermal runaway mitigation for batteries, such as may be used in a vehicle electrical system. In order to mitigate battery thermal runaway, in some examples, a battery system of a vehicle may include one or more cooling elements configured to expel coolant onto one or more energy storage cells that have entered thermal runaway. In some examples, a battery system of a vehicle may include one or more heat shields and/or vents to direct hot gas or other material expelled from an energy storage cell in thermal runaway away from other energy storage cells. These and other techniques may be used to mitigate propagation of thermal runaway from one energy storage cell to other energy storage cells of the battery system.

The vehicle described herein may include a vehicle that is powered in whole or in part by one or more batteries. Although primarily discussed in the context of powering an autonomous vehicle, the methods, apparatuses, and systems described herein may be applied to providing power to a variety of systems (e.g., a sensor system or a robotic platform), and are not limited to autonomous vehicles. In another example, the techniques may be utilized in an aviation or nautical context, as a distributed storage system, a battery backup system, or in any system powered by the one or more batteries.

According to some examples, a vehicle electrical system may include a plurality of batteries configured in one or more battery packs. In some examples, a battery pack may include multiple battery modules (e.g., groups of energy storage cells, battery subsystems, etc.). In some examples, a battery pack may include multiple stacked battery modules. The battery pack may include a casing configured to secure the battery modules in place in the vehicle. The casing may be made of a metal material (e.g., aluminum, steel, titanium, etc.), a plastic material (e.g., polymer, etc.), a ceramic material, a composite material (e.g., fiberglass, carbon fiber, Kevlar, etc.), or a combination of the foregoing or other materials.

The battery pack may include multiple battery module bays, each battery module bay being configured to house a battery module. In some examples, each battery module bay may include a pair of rails or other supports on opposing sides of an interior of the casing to support the respective battery module. The pairs of rails may be configured to connect to couplers on opposing sides of a battery module (e.g., exterior surface of a battery module housing).

In some examples, at least some of the battery module bays may include a space surrounding at least a portion of a battery module. The space may include an air gap between a top of a first module and a bottom side of a second module. The air gap may act as a barrier to heat transfer between the first and second modules. The air gap may act as a channel to expel gas, active material, and or expelled coolant during a thermal runaway event. In some examples, the space may extend to a side portion of the respective battery module. The space may be bounded, at least in part, by the pairs of rails associated with the first and second modules (e.g., pairs of rails to which the first module and the second module are coupled). In some examples, the pairs of rails may provide a barrier to prevent or restrict passage of air between the respective spaces adjacent the sides of the respective battery modules. In such cases, the rails may be configured to substantially thermally insulate a first battery module bay from a second battery module bay. In such examples, the pairs of rails may provide a barrier configured to preclude hot gases produced by a battery module, such as in thermal runaway, from substantially affecting another battery module.

In some examples, the battery module may include a battery module housing. The battery module housing may include a cover (or top), one or more sidewalls, and a base (or bottom). The cover, the side wall(s), and/or the base may comprise a metal, ceramic, plastic, composite material, or a combination thereof. Each of the cover, the side wall(s), and the base may be made of a same or different material from one another. In at least one example, the cover may comprise a sheet of stainless-steel material. In some examples, some or all of the battery modules may include a heat shield and/or insulating material disposed proximate or adjacent to the cover, the side wall(s), and/or the base. In some examples, the heat shield and/or insulating material may comprise mica (for example, phlogopite, muscovite, or other mica group phyllosilicates), silicone rubber, Teflon, ceramic, ceramic compounds, aerogel, or other thermally insulating or reflecting material. In some examples, the heat shield and/or insulating material, when provided, may be laminated, glued, or otherwise affixed to the cover the side wall(s), and/or the base. In some examples, heat shield materials may comprise multiple layers of the same or different material (e.g., two layers of mica may be laminated together, a layer of mica may be laminated to a layer of Teflon, or combinations thereof). In some examples, the heat shield may comprise multiple layers of the same or different material where a layer has a different configuration than another (e.g., a first layer of mica being a solid sheet may be laminated to a second layer of mica having a hole or a plurality of holes creating a heat shield with different thicknesses (e.g., thinner at locations corresponding to the hole or plurality of holes in the second layer than other locations corresponding to both the first and second layers.)). In some examples, the cover, the side wall(s), and/or the base may be configured to substantially thermally insulate a respective battery module from another battery module situated adjacent (e.g., above or below) the respective battery module. In some examples, at least two of the side wall(s) of the battery housing may be configured with couplers configured to receive (or be received by) rails, such as those described above. In some examples, one side wall of the battery may be configured with a coupler to receive a rail, and an opposing side wall may be configured with a rail to couple to a coupler of the casing of the battery pack.

In some examples, the battery housing may enclose a plurality of cells, for example energy storage cells. In some examples, the battery modules may be configured to vent gases, such as gases emitted from one or more of the plurality of cells. In such examples, the gases may vent out of the battery module via one or more battery module vents. In some examples, the gases may vent from an interior compartment of the battery module into the space surrounding at least the portion of the battery module. In some examples, each battery module bay of the battery pack may include one or more vents (e.g., casing vents) for venting gases outside of the casing. The casing vent(s) may be configured to substantially equalize pressure between the battery module bay (e.g., space containing gas) and an atmosphere outside the casing. In some examples, the casing vent(s) may comprise a breathable material (e.g., membrane) configured to filter contaminants from gases exiting the vent(s) and/or to prevent contaminants from entering the battery pack. In some examples, the casing vent(s) may be configured to be sealed during normal operation and to "blow out" (i.e., release pressure) such as when subjected to a threshold pressure differential between the battery module bay and the atmosphere outside the vehicle. The battery module vent(s) and the casing vent(s) may prevent a battery module from over-pressurizing and/or over-heating, such as in the case of a cell failure and/or thermal runaway.

In some examples, the plurality of cells may be configured in multiple rows of cells. In some examples, the cells in a row of cells may be in parallel. In some examples, the cells in a row of cells may be configured in series. In some examples, each cell in a roll of cells may be configured with a positive polarity on a first side of the battery module and a negative polarity on a second side of the battery module opposite the first side.

FIG. 1 is an illustration of an example autonomous vehicle 100 having one or more batteries configured with thermal runaway mitigation systems to provide power to operating systems of the autonomous vehicle, in accordance with examples of the disclosure.

In the illustrated example, the vehicle 100 includes a first drive assembly 102A and a second drive assembly 102B (collectively "drive assemblies 102") coupled to a body 104. Each of the drive assemblies 102 in this example includes multiple vehicle systems. For example, the first drive assembly 102A in this example includes a first battery with thermal mitigation system 106A and a first cooling system 108A, and the second drive assembly 102B includes a second battery with thermal mitigation system 106B and a second cooling system 108B. The first battery with thermal mitigation system 106A and the second battery with thermal mitigation system 106B may be referred to collectively as "batteries 106," and the first cooling system 108A and the second cooling system 108B may be referred to collectively as "cooling systems 108." Each of the first drive assemblies in this example also include one or more motor(s) 110 and one or more other systems 112. In some examples, motor(s) 110 comprise or are part of a propulsion system of the vehicle. By way of example and not limitation, the other system(s) 112 may comprise a steering system, a braking system, a suspension system, related controls and actuators for the forgoing systems, electronics related to supplying power from the one or more batteries 106 to one or more other components or systems of the drive assemblies 102 and/or the body 104. In some examples, the drive modules may also include exterior lighting, body panels, facia, and/or sensors.

The body 104 in this example includes one or more computer systems 114 to control operation of one or more systems of the vehicle 100. For instance, in the case of an autonomous vehicle, the computer system(s) 114 may include one or more processors and memory and may be configured to control the vehicle 100 to, among other things, receive and process sensor data from one or more sensors and to plan a route for the vehicle through an environment.

In some examples, the cooling systems 108 may be used to cool the batteries 106 by circulating coolant from the cooling systems 108 to and/or through the batteries 108 via one or more fluid circuits to transfer thermal energy away from the batteries 106 to at least one of the cooling systems 108. The cooling systems 108 may also be used to cool one or more other systems of the vehicle 100. For instance, in some examples the first cooling system 108A and/or the second cooling system 108B may comprise a heating ventilation and air conditioning (HVAC) system used to cool a passenger compartment of the vehicle. In examples, in some examples the first cooling system 108A and/or the second cooling system 108B may provide cooling to a motor 110 of the first drive assembly 102A and/or the second drive assembly 102B. By way of example and not limitation, the cooling systems 108 may include one or more reservoirs, circulation systems, heat exchangers, condensers, compressors, valves, and/or controllers to provide cooling and/or thermal management to various components and/or systems of vehicle 100.

As shown in FIG. 1, the first battery with thermal mitigation system 106A includes a battery pack 116 shown in the detail view outlined in dashed lines. While not shown in FIG. 1, the second battery with thermal mitigation system 106B also includes a battery pack 116. Thus, in the illustrative example of FIG. 1, the vehicle 100 includes two battery packs. In other examples, the vehicle 100 may include a greater or lesser number of battery packs.

Each of the battery packs 116 may be configured with one or more battery modules 118(1), 118(2), . . . 118(N) (collectively "battery modules 118"), where N is any integer greater than or equal to 1 (e.g., batteries, battery subsystems, etc.). In the illustrative example, each of the battery packs 116 include six battery modules 118 configured in a stack. In other examples, the battery packs 116 may include a greater or lesser number of battery modules 118. Additionally, in other examples, the battery module(s) 118 may be configured differently, such as substantially horizontally, substantially vertically, rotated 90 degrees from that shown in FIG. 1, and/or in any other configuration.

In some examples, the battery module(s) 118 may be coupled to a casing 120 of the battery pack 116. The casing 120 may include a metal material (e.g., aluminum, steel, titanium, etc.), a plastic material (e.g., polymer, etc.), a ceramic material, a composite material (e.g., fiberglass, carbon fiber, Kevlar, etc.), or a combination thereof. In at least one example, the casing 120 may include a metal material, formed via an extrusion process. In some examples, the casing 120 may include a base, a cover, and four side walls including a front side wall, a rear side wall, a right side wall and a left side wall (e.g., first side wall, second side wall, third side wall, fourth side wall). Although illustrated as a cross section, with one side of the casing 120 removed, the casing 120 of the battery pack 116 may be configured to envelope the battery modules 118 on all sides. In some examples, the casing 120 of the battery pack 116 may be configured to be substantially water proof and/or water resistant.

In some examples, each battery module 118 may be configured to couple to a casing attachment mechanism. In some examples, the casing attachment mechanism may include pairs rails 122(1), 122(2), . . . 122(M) (collectively "rails 122"), where M is any integer greater than or equal to 1. The number of pairs of rails M may or may not be equal to the number of battery modules N. The rails 122 may include a metal material, a ceramic material, a composite material, a plastic material, or a combination of the foregoing. The rails 122 may include the same material or a different material than the casing 120. In some examples, the rails 122 may be disposed on an internal surface of the front side wall (e.g., first side wall) and the rear side wall (e.g., second side wall) in a substantially horizontal configuration. In some examples, the rails 122 may extend from a first end, substantially situated at the right side wall (e.g., third side wall), to a second end, substantially situated at the left side wall (e.g., fourth side wall). In such examples, the rails 122 may substantially extend a length of the casing 120.

The rails 122 may be configured to connect to couplers on opposing sides of a battery module 118 (e.g., exterior surface of a battery housing). In some examples, the rails 122 may include a coating. The coating may include rubber, polyurethane, nylon, Teflon, silicone, polypropylene, polyethylene, or the like. In some examples, the coating may be configured to increase and/or decrease a frictional component between the rails 122 and the couplers of the battery modules 118. In some examples, the coating may be configured to assist in substantially thermally isolating heat of one battery module (e.g., battery module 118(1)) from affecting another battery module (e.g., battery module 118(2)). In such examples, the coating may assist in preventing gases, such as those emitted from a battery module during thermal runaway, from propagating to the other battery module.

In the illustrative example, the rails 122 are configured in pairs of rails 122 disposed on opposite internal surfaces of the battery pack 116. Each of the pairs of rails 122 can be connected to couplers (e.g., module couplers, module attachment mechanisms, etc.) on opposite sides of a battery module 118. In some examples, the casing attachment mechanism may include a casing coupler disposed on an internal surface opposite a respective rail 122. In such examples, a battery module 118 may be configured to couple to a casing coupler via a rail disposed on the battery module 118 on one side and a rail 122 of the battery pack 116 via a module coupler on the other side. In some examples, the opposing internal surfaces of the battery pack 116 may include alternating rails 122 and casing couplers. For example, a casing coupler may be disposed between two rails. In some examples, the opposing internal surfaces of the battery pack 116 may include casing couplers on a first internal surface and rails 122 on a second internal surface, the first internal surface and the second internal surface being opposite internal side walls.

In some examples, each rail 122 may be disposed at a substantially equal distance vertically from one another. In such examples, each battery module 118 may be spaced a substantially similar vertical distance from another battery module 118 inserted into the casing 120. For example, after insertion, such as via sliding the couplers of the battery module 118 along the rails 122, a bottom side of a first battery module 118(1) may be spaced a distance from a top side (e.g., cover) of a second battery module 118(2). The distance may provide an air gap configured to prevent direct thermal conduction between the first battery module 118(1) and the second battery module 118(2).

Additionally, in some examples, after insertion, the battery module(s) 118 may be secured into the casing via one or more fasteners (e.g., screws, rivets, pins, snap connectors, latches, spring-type fasteners, etc.) at an end of the rails 122.

In some examples, the coupling of the battery modules 118 in the casing 120 via one or more pairs of rails 122 results in a relatively stiff and rigid battery pack 116. The stiffness of the battery pack 116 may increase a torsional and/or lateral stiffness of the vehicle 100. In such examples, the stiffness of the battery pack 116 may increase vehicle 100 handling, steering, and/or ride characteristics. In at least one example, one or more battery modules 118 in the battery pack 116 may be offset from other battery modules 118 in the battery pack 116. For example, as illustrated in FIG. 1, the bottom two battery modules 118 in the battery packs 116 are offset from a vertical stack of four other battery modules 118. The offset design of one or more of the battery modules 118 may additionally increase a stiffness of the battery pack 116, further improving torsional and/or lateral stiffness of the vehicle 100. In some examples, an increase in the torsional and/or stiffness of the vehicle may also minimize vibration of the battery pack 116, reducing the risk of damage to cells of the battery pack which could lead to thermal runaway. In some examples, the battery module(s) 118 in a battery pack 116 may be configured substantially the same or similar to one another. In such examples, the battery module(s) 118 in a battery pack 116 may be interchangeable. The battery module(s) 118 may include a battery module housing including at least a base and four side walls. At least two of the four side walls may be configured with the couplers described above that are configured to slide along the rails 122 in the casing 120. In some examples, the at least two of the four side walls may be configured with a module attachment mechanism configured to couple to a casing attachment mechanism, such as those described above. In such examples, the casing attachment mechanism may include at least a rail or a coupler and the corresponding module attachment mechanism may include the other of the rail or the coupler. In some examples, the battery module housing may additionally include a cover.

As described above, the battery module housing may comprise a metal, a ceramic, a plastic, a composite material, or a combination thereof. The base, four side walls, and the cover may comprise a same or similar material. In some examples, the base, the four side walls, and/or the cover may include an insulating material (e.g., mica, silicone rubber, Teflon, etc.). In some examples, those insulating materials may be coupled to (e.g., laminated, glued, etc.) other materials (e.g., metal, ceramic, plastic, or combinations thereof), for example, for structural, protection, and/or durability purposes.

In some examples, the battery housing may enclose a plurality of cells of the battery module 118. Each cell of the plurality of cells may include a cylindrical cell, a pouch cell, a prismatic cell, a button cell, or the like. In some examples, the cells in the plurality of cells are cylindrical cells. In some examples, the plurality of cells may be separated from one another by an insulating material. In some examples, the insulating material may comprise an insulating foam (e.g., silicone foam, silicone potting, etc.). In some examples, the insulating material disposed between individual cells of the plurality of cells may substantially fill an interstitial space between the cells and may mitigate effects of thermal runaway of a single cell by isolating the cell from other cells proximate thereto. In such examples, the insulating material may enhance thermal runaway mitigation techniques by thermally isolating the cells from one another.

In some examples, one or more of the cooling systems 108 provide coolant to the battery modules 118 to further improve thermal runaway mitigation. In the illustrated example, coolant is supplied to the battery modules 118 via a coolant manifold 124 connecting through port 126 on a battery module 118. The coolant may be supplied to the coolant manifold 124 by the first cooling system 108A and/or the second cooling system 108B of vehicle 100 via connection port 128.

As discussed above, in some examples the first cooling system 108A and the second cooling system 108B may be separate systems that are not in fluid communication with one another. For example, the first cooling system 108A may provide coolant to the battery pack 116 of the first battery 106A from a first coolant circuit including a first coolant reservoir, and the second cooling system 108B may provide coolant to the battery pack 116 of the second battery 106B from a second coolant circuit including a second coolant reservoir. In this example, the battery packs 116 of the first battery 106A and the second battery 106B are not in fluid communication with each other.

In other examples, the first cooling system 108A may be in fluid communication with the second cooling system 108B. For instance, the first cooling system 108A may provide coolant to the battery packs 116 of both the first battery 106A and the second battery 106B from a common coolant circuit. In this example, the battery packs 116 of the first battery 106A and the second battery 106B are in fluid communication with each other.

Additionally or alternatively, in some examples the first cooling system 108A and the second cooling system 108B may be selectively connected or disconnected. For example, it may be desirable to operate the first battery 106A and second battery 106B as separate systems in some circumstances (e.g., during normal operation), and may be desirable to operate the first battery 106A and the second battery 106B from a common system in other circumstances (e.g., upon detecting occurrence of a thermal runaway event). For example, operating from separate cooling systems may allow control of the cooling and flowrates of the coolant to each battery pack 116 based on the status and condition of each battery pack 116 which may result in more efficient cooling. Additionally or alternatively, separate cooling systems provides a level of redundancy such that a failure in a first cooling system does not affect a second cooling system, and may allow the second cooling system to supply sufficient cooling to a battery pack. Additionally or alternatively, providing control to connect or disconnect the cooling systems 108 provides flexibility to provide cooling to two or more battery packs 116 from a common cooling system or reservoir when needed. For example, during a thermal runaway event, it may be desirable to provide additional coolant to the battery pack 116 experiencing the thermal runaway event.

Additionally or alternatively, some examples contemplate that the cooling systems 108 may provide a circulation path for the coolant. For example, cooling systems 108 may provide coolant to an inlet side of a battery pack 116, where coolant may be circulated to one or more cooling elements disposed within one or more modules of the battery pack 116, and may be returned to the cooling system 108 through an outlet side, for example, on an opposite side of the battery pack 116.

Additionally, to further improve thermal runaway mitigation for batteries, the battery modules 118 may be configured to vent gases, such as gases emitted from one or more of the plurality of cells. In some examples, gases may vent out of an uncovered surface of the battery modules 118. In such examples, the battery modules 118 may not include a cover, and gas may be free to vent from the plurality of cells into a space between modules and/or between a module and an interior surface of the casing. In some examples, the gases may vent out of the battery module through the cover. For example, if the gas exhausted, for example, during a thermal runaway event, the gas and/or active material may breach the top and be vented into a gap between adjacent modules.

In some examples, each battery module bay of the battery pack may include one or more vents (not shown in this figure) for venting gases outside of the vehicle. As discussed above, the vent(s) may be configured to substantially equalize pressure between the battery module bay (e.g., space containing gas) and an atmosphere outside the vehicle. In some examples, the casing vent(s) may comprise a breathable material (e.g., membrane) configured to filter contaminants from gases exiting the casing vent(s). In some examples, the casing vent(s) may be configured to blow out (e.g., removed from casing to maximize a pressure equalization), such as when subjected to a threshold pressure differential between the battery module bay and the atmosphere outside the vehicle. The battery module vent(s) and the casing vent(s) may prevent a battery module from over-pressurizing and/or over-heating, such as in the case of a cell failure and/or thermal runaway, thereby improving thermal runaway mitigation of the electrical system.

In some examples, the computer systems 114 controls operation of one or more systems of the vehicle 100. For instance, in the case of an autonomous vehicle, the computer system(s) 114 may include one or more processor(s) 130 and memory 132 communicatively coupled with the one or more processor(s) 130 and may be configured to control the vehicle 100 to, among other things, receive and process sensor data from one or more sensors and to plan a route for the vehicle through an environment.

In the illustrated example, the vehicle 100 is an autonomous vehicle; however, the vehicle 100 could be any other type of vehicle, such as a semi-autonomous vehicle, or any other system having at least an image capture device (e.g., a camera enabled smartphone). Though depicted in FIG. 1 as residing in the body 104 for illustrative purposes, it is contemplated that the computer systems 114 be accessible to the vehicle 100 (e.g., stored on, or otherwise accessible by, memory remote from the vehicle 100, such as, for example, on memory of a remote computer device). In some examples, multiple computer systems 114 may be included on the vehicle 100. In some examples, computer systems 114 may be located within the body 104, a drive assembly 102, or combinations thereof.

The processor(s) 130 of the vehicle 100 may be any suitable processor capable of executing instructions to process data and perform operations as described herein. By way of example and not limitation, the processor(s) 130 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 132 is an example of non-transitory computer-readable media. Memory 132 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 132 may include at least a working memory and a storage memory. For example, the working memory may be a high-speed memory of limited capacity (e.g., cache memory) that is used for storing data to be operated on by the processor(s) 130. In some instances, memory 130 may include a storage memory that may be a lower-speed memory of relatively large capacity that is used for long-term storage of data. In some cases, the processor(s) 130 cannot operate directly on data that is stored in the storage memory, and data may need to be loaded into a working memory for performing operations based on the data, as discussed herein.

Figure 2:
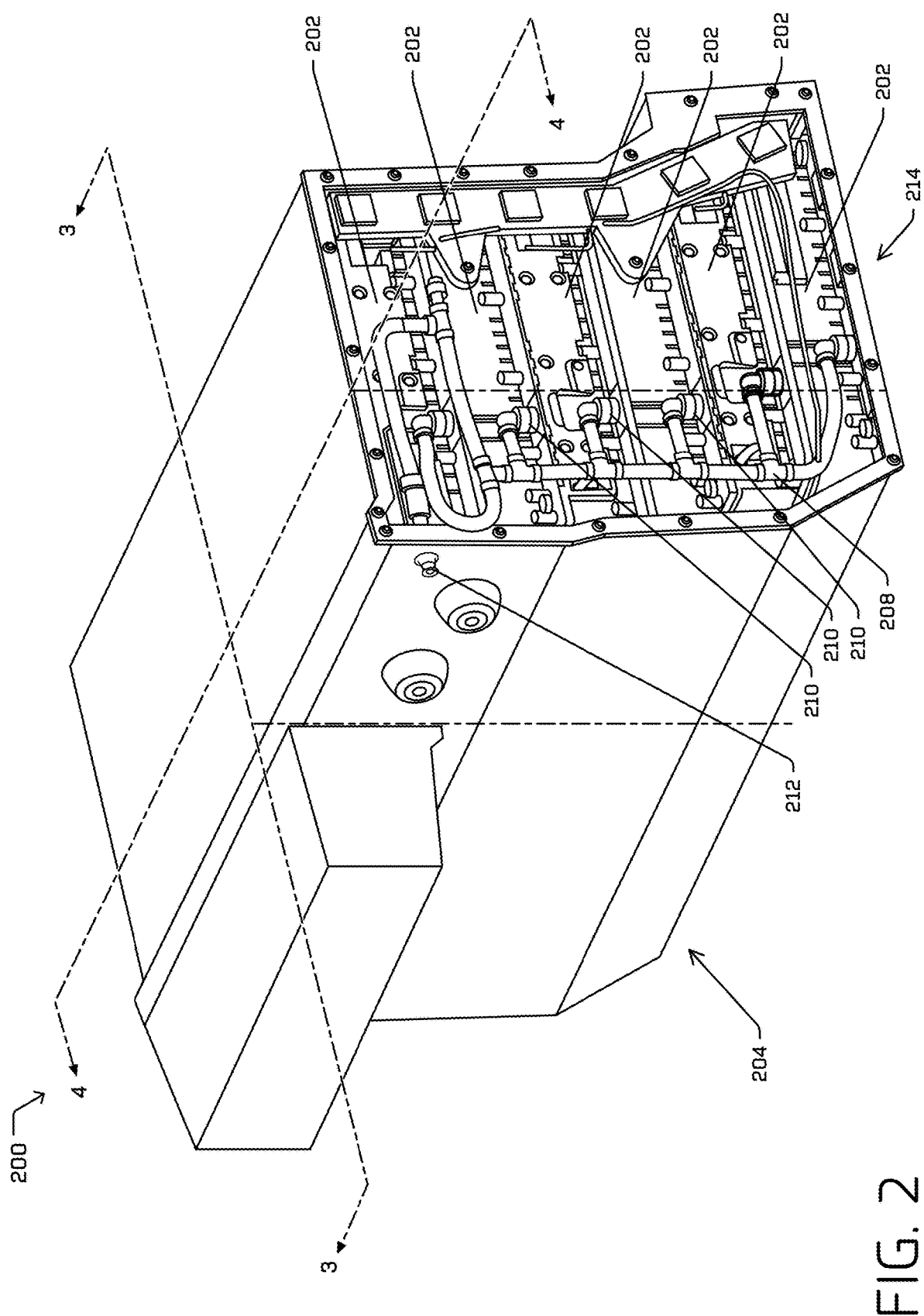
FIG. 2 is a perspective view of an example battery pack of an electrical system configured to provide power to a vehicle, in accordance with embodiments of the disclosure.

FIG. 2 is a perspective view of an example battery pack 200, such as battery pack 116, of an electrical system configured to provide power to a vehicle, in accordance with embodiments of the disclosure. The battery pack 200 includes a plurality of battery modules 202, such as battery modules 118. In some examples, the battery modules 202 in battery pack 200 may be configured substantially the same, and thus may be interchangeable in the battery pack 200. In the illustrative example, the battery pack 200 includes six stacked battery modules 202, the bottom two battery modules 202 being slightly offset from the other four battery modules 202. In other examples, the battery pack 200 may include a greater or lesser number of battery modules 202. Additionally, in other examples, the battery modules 202 may be disposed in different orientations within the battery pack 200. The different orientations may include battery modules being disposed substantially horizontally, both horizontally and vertically, vertically with no offset, horizontally and/or vertically with more and/or different battery modules offset, or the like.

FIG. 2 also shows casing 204, such as casing 120, with a panel (not shown) removed from an end of casing 204 exposing battery modules 202. In this example, battery modules 202 are connected to coolant manifold 208, such as coolant manifold 124, through ports 210, such as ports 126. Coolant manifold 208 may be connected to one or more cooling systems, such as cooling systems 108, of a vehicle, such as vehicle 100 through connection port 212 such as connection port 128. In this configuration, FIG. 2 shows outlet side 214 of battery pack 200. However, it is understood that coolant may flow in either direction as desired. For example, if a triggering event occurs in battery pack 200, coolant may be expelled into battery pack 200 to mitigate a thermal runaway event.

Figure 3:
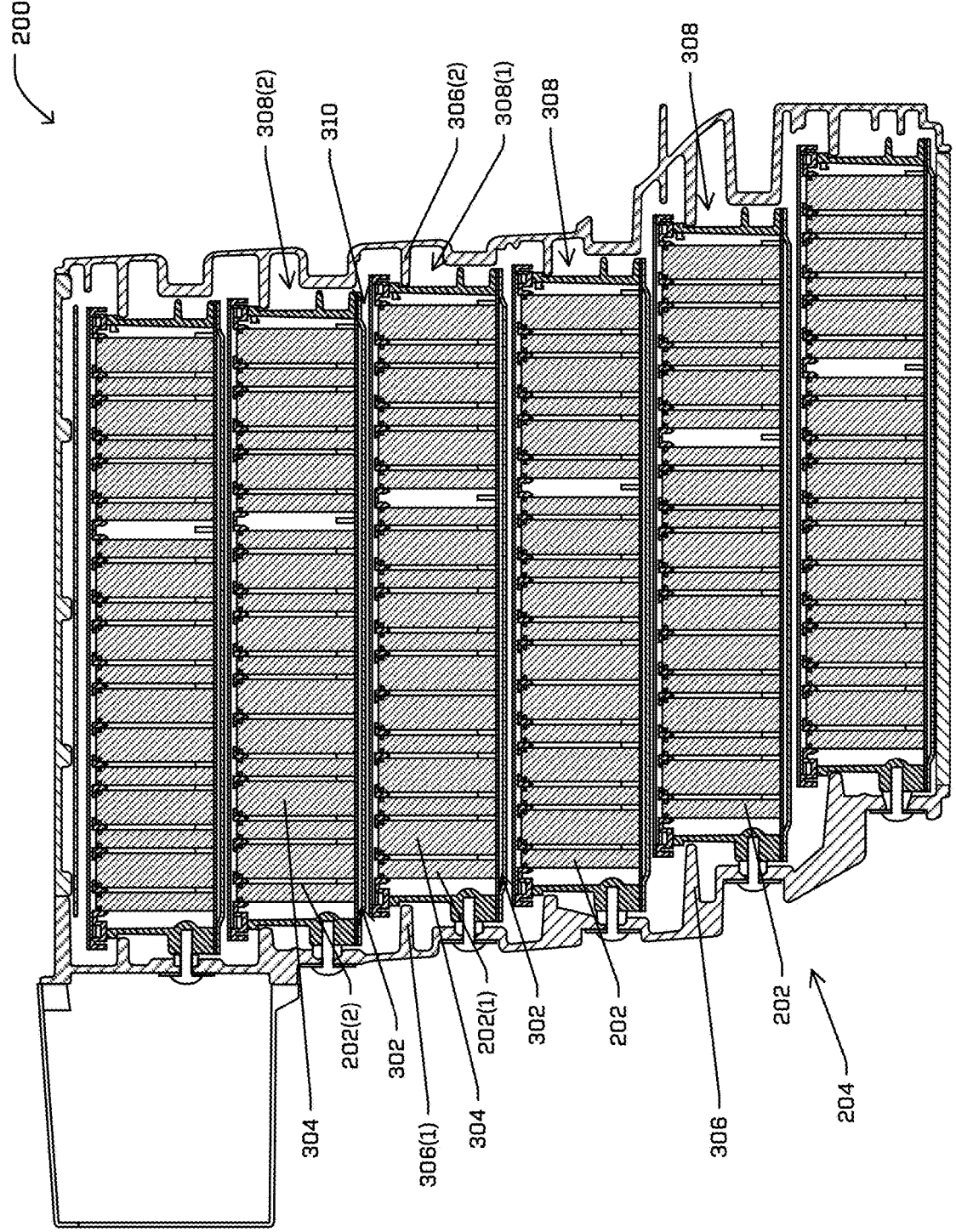
FIG. 3 is across section view of the example battery pack of FIG. 2 taken along line 3-3 in FIG. 2.

FIG. 3 is a cross sectional view of the battery pack of FIG. 2, taken along line 3-3 in FIG. 2. Battery pack 200 includes a plurality of battery modules 200. In the illustrated example, the battery modules 202 each comprise a cooling element 302 to receive coolant from the cooling manifold 208 (not shown in this figure). In some examples, cooling element 302 may receive coolant from a cooling system and may circulate the coolant through the cooling plate via channels, tubes, passages, cavities, coils, or other features, to remove heat from the battery module. In the example of FIG. 3, the cooling element is shown as a cooling plate disposed within battery module 202 below a plurality of energy storage cells 304 of the respective battery module.

In the illustrative example, the battery pack 200 includes six stacked battery modules 202, the bottom two battery modules 202 being slightly offset from the other four battery modules 202. In other examples, the battery pack 200 may include a greater or lesser number of battery modules 202. Additionally, in other examples, the battery modules 202 may be disposed in different orientations within the battery pack 200. The different orientations may include battery modules being disposed substantially horizontally, both horizontally and vertically, vertically with no offset, horizontally and/or vertically with more and/or different battery modules offset, or the like.

FIG. 3 also shows casing 204, such as casing 204 housing battery modules 202. In some examples, battery modules 202 may be inserted into battery pack 200 and secured to casing 204 via rails 306, such as rails 122. In this example, battery module 200(1) may be secured to casing 204 via rails 306(1) and 306(2).

In some examples, the battery module(s) 202 may each be housed in a battery module bay 308 of the battery pack 200. Each battery module bay 308, such as battery module bays 308(1) and 308(2) may include a space in which to house a battery module 202, such as battery modules 202(1) and 202(2), respectively, and a space surrounding at least a portion of the battery module 202. The space surrounding the at least the portion of the battery module 202 may provide an air gap 310 between two battery modules, such as the illustrated space between battery modules 202(1) and 202(2). In some examples, the space surrounding the at least the portion of the battery module 202 may assist in thermally isolating the battery modules 202 from one another, such as in the event of a battery module 202 thermal runaway (e.g., accelerating temperature increase). In other examples, the space surrounding the at least the portion of the battery module 202 may assist in triggering a thermal mitigation action from the system.

In some examples, the battery modules 202 may be configured with one or more vents (not illustrated) to vent gases out of respective battery modules 202. In some examples, the vent(s) may be disposed along a side wall of the battery modules 202, extending at least partially along a length of the side wall. In some examples, in the event of a thermal runaway of one or more cells of a battery module 202, gases and active material generated from the thermal runaway may exit the battery module via the vent(s).

In some examples, the rails 306 may be configured to substantially preclude or limit the gases exiting a battery module, such as battery module 202(2) from substantially effecting a second battery module, such as battery module 202(1), such as by substantially thermally isolating (e.g., insulating) the battery modules 202. In such examples, the rails 306(1) and 306(2) may provide a barrier configured to limit gas flow between battery module bay 308(2) and battery module bay 308(1). Substantially precluding the hot gases from entering the battery module bay 308(1), and consequently surrounding battery module 202(1), may reduce an impact of the thermal runaway of battery module 202(2) on an internal temperature of battery module 202(1).

Figure 4:
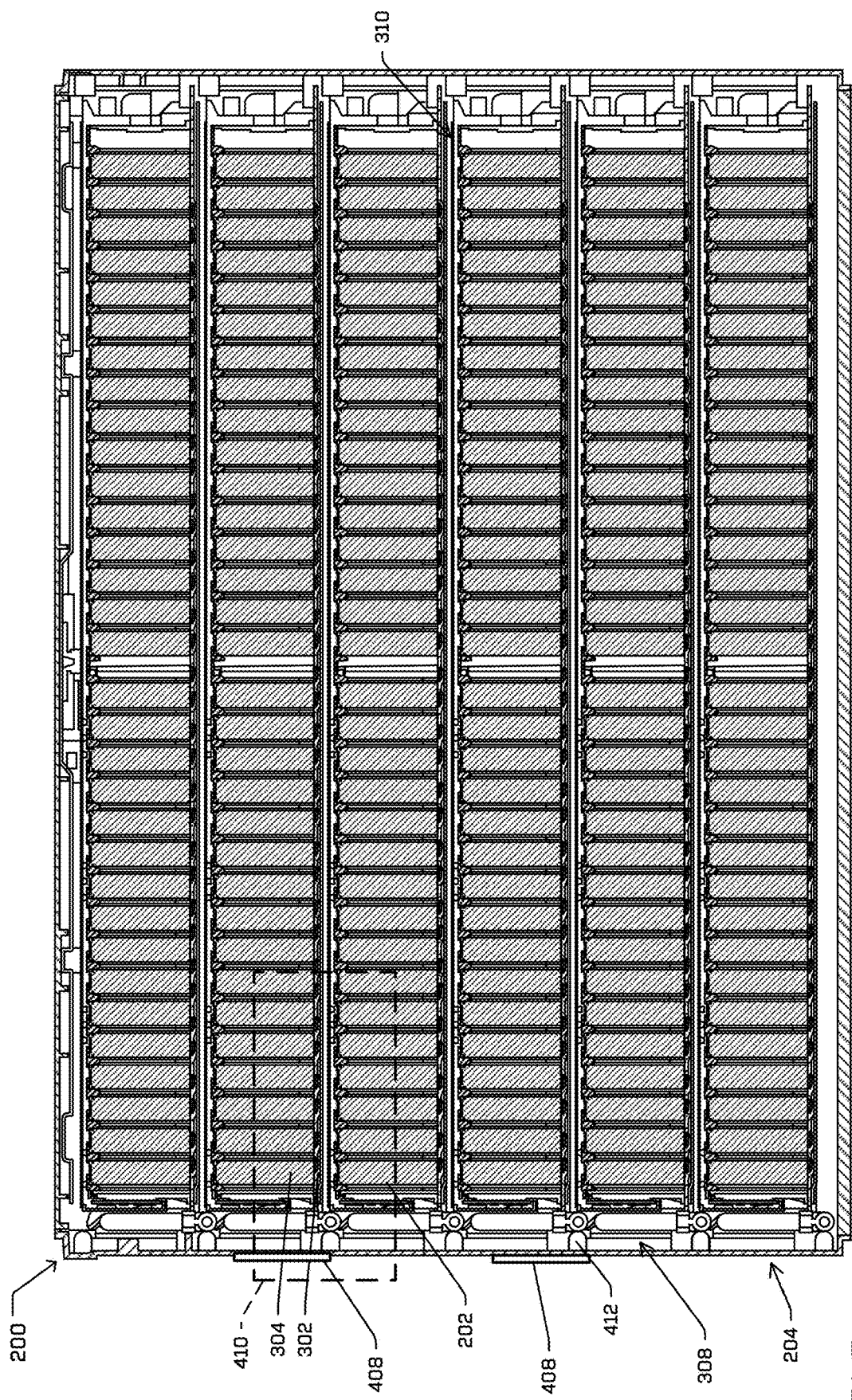
FIG. 4 is across section view of the example battery pack of FIG. 2 taken along line 4-4 in FIG. 2.

FIG. 4 is a cross-sectional view of the battery pack 200 of FIG. 2, taken along line 4-4 in FIG. 2. FIG. 4 shows a view perpendicular to the view shown in FIG. 3. The battery pack 200 includes a plurality of battery modules 202 that comprise cooling element 302 and receive coolant from the cooling manifold 208 (not shown in this figure). FIG. 4 shows the cooling element as a cooling plate disposed within battery module 202 below a plurality of energy storage cells 304 of the respective battery module.

In the illustrative example, the battery pack 200 includes six stacked battery modules 202. In other examples, the battery pack 200 may include a greater or lesser number of battery modules 202.

FIG. 4 also shows casing 204, such as casing 204, housing battery modules 202. In some examples, battery modules 202 may be inserted into battery pack 200 and secured to casing 204 such that adjacent battery modules are separated by a space. The space surrounding at least the portion of the battery module 202 may provide an air gap 310 between two battery modules 202.

In some examples, the space surrounding the battery module 202 may assist in thermally isolating the battery modules 202 from one another, such as in the event of a battery module 202 thermal runaway (e.g., accelerating temperature increase). In other examples, the space surrounding the at least the portion of the battery module 202 may assist in triggering a thermal mitigation action from the system.

In some examples, the battery modules 202 may be configured with one or more vents 408 to vent gases out of respective battery modules 202. In some examples, the vent(s) 408 may be disposed along a side wall of the battery modules 202, extending at least partially along a length of the side wall. In some examples, in the event of a thermal runaway of one or more cells of a battery module 202, gases and active material generated from the thermal runaway may exit the battery module via the vent(s) 408.

In some examples, the battery modules 202 may be configured with one or more troughs 412 to guide fluid away from electronics and out of the respective battery modules 202. In some examples, trough 412 may be disposed along a side wall of the battery modules 202, extending at least partially along a length of the respective battery module 202. In some examples, trough 412 may take the form of a moat, channel, gutter, trench, or combinations thereof, among others. In some examples, in the event of a thermal runaway of one or more cells of a battery module 202, gases and active material generated from the thermal runaway may exit the battery module via the trough 412. In some examples, the trough 412 may direct gasses and active material to exit the battery module 202 through vent 408. In some examples, trough 412 may create a barrier between adjacent battery modules 202 to prevent or reduce gases, active material, and/or coolant from entering an adjacent module bay 308. Trough 412 may additionally or alternatively be configured to collect and route coolant expelled from a battery module 202 out of the battery pack 200.

Additionally or alternatively, in some examples, trough 412 may be integrated into one or more of the battery modules 202, for example, as a flange or surface protruding from and/or affixed to one or more edges of the battery modules 202. In some examples, trough 412 may be formed as a flange or surface protruding from and/or affixed to the an inward facing surface of the casing 204.

Figure 5:
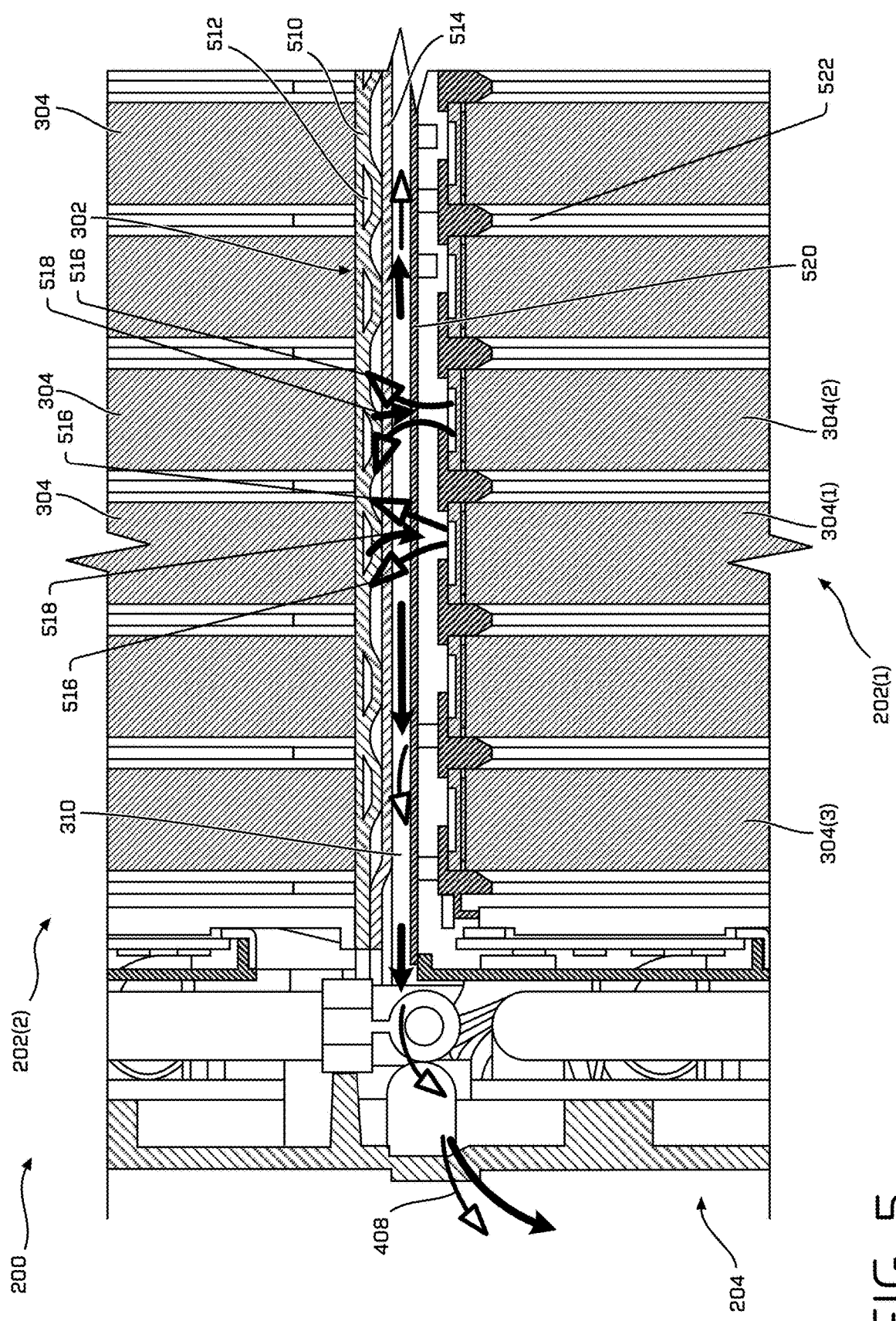
FIG. 5 is a close-up view of a battery pack with two battery modules inserted therein, the close-up view illustrating fluid paths used during a thermal runaway event, in accordance with embodiments of the disclosure.

FIG. 5 is an enlarged view of section 410 of FIG. 4, and shows battery pack 200 with battery modules 202(1) and 202(2) housed within casing 204 separated by gap 310. As discussed above, the battery modules 202 contain energy storage cells 304 for providing power. For example, battery module 202(2) includes cells 304 while battery module 202(1) includes cells 304(1)-(3). In this illustrative example, the cooling element 302 of battery module 202(2) comprises a cooling plate 510 with cooling channels 512 as well as a reinforcement plate 514. In this example, cooling plate 510 may circulate coolant through cooling channels 512 and help regulate thermal characteristics of cells 304 of battery module 202(2). In some examples, the cooling channels 512 may be in fluid communication with one or more cooling systems, such as cooling systems 108 to move coolant and heat in and out of cooling plate 510.

In an example where a thermal runaway event occurs in one or more cells, for example, cells 304(1) and 304(2) of battery module 202(1), cells 304(1) and 304(2) may over heat and eject gas and/or active material 516 (represented as open ended arrows) during the thermal runaway event. The ejected gas and/or active material 516 may leave the cells 304(1)-(2) at a high temperature and/or at a high rate of speed. Upon leaving the cells, the ejected gas and/or active material 516 may impinge on a lower surface of battery module 202(2). When the ejected gas and/or active material 516 reaches a threshold energy level (this may be a combination of temperature, speed, mass of the ejected gas and/or active material 516), the ejected gas and/or active material 516 will trigger a breach in cooling plate 510 to expel coolant 518 (represented by solid arrows) from cooling channels 512. The threshold energy depends on the material and/or thicknesses of the upper and lower surfaces of the cooling element, reinforcement plate, and/or heat shield of battery module 202(2), and any heat shield and/or, cover of battery module 202(1).

Expelled coolant 518 may mix with ejected gas and/or active material 516 to reduce the energy level of ejected gas and/or active material 516 to reduce or mitigate thermal runaway. Additionally or alternatively, expelled coolant 518 may engage (e.g., douse or drench) cells 304(1) and 304(2) to further reduce or mitigate thermal runaway. In examples, the reduction in the energy level of ejected gas and/or active material 516 may prevent or slow other cells 304, for example, cell 304(3) from entering thermal runaway.

In examples, while leaving cells 304(1) and 304(2) ejected gas and/or active material 516 may pass through heat shield 520 of battery module 202(1). In examples, heat shield 520 may include an include insulative properties. For example, heat shield 520 may provide thermal insulation from an adjacent battery module. In examples, heat shield 520 may provide electrical insulation from adjacent battery modules or devices. In examples, heat shield 520 may be made of mica, for example, phlogopite, muscovite, silicone rubber, Teflon, ceramics, among others, or combinations thereof.

In examples, heat shield 520 be frangible such that when ejected gas and/or active material 516 pass through heat shield 520, a hole is created in heat shield 520 sufficient to allow ejected gas and/or active material 516 to pass into gap 310, but without causing ejected gas and/or active material 516 to be directed to other cells 304, for example, cell 304(3). In this example, heat shield 520 may provide a check valve functionality where ejected gas and/or active material 516 is allowed to leave battery module 202(1), but not reenter an affect other cells 304, for example, cell 304(3).

In examples, heat shield 520 may a thickness based on several factors. For example, the material of the heat shield 520, the distance from cells 304, the types of cells 304, or combinations thereof, among others, may drive the thickness of heat shield 520. In some examples, heat shield may be between about 1 millimeter and about 3 millimeters thick. In some examples, heat shield 520 may be disposed less than about 10 millimeters from the cells. For instance, the heat shield 520 may be disposed adjacent to cells 304 and (e.g., in contact with cells 304), about 3 millimeters away, about 5 millimeters away, about 7 millimeters away, about 10 millimeters away, or more. In some examples, the distance between heat shield 520 and cells 304 may vary within a battery module and/or between different battery modules. In some examples, the distance between heat shield 520 and cells 304 may depend on a layout and/or configuration of the battery module. For example, wire bonds and/or plastic holders, or a lack thereof, disposed above the cells 304 may cause a larger distance or allow a shorter distance between cells 304 and heat shield 520.

Additionally or alternatively, in some examples, when heat shield 520 is relatively closer to cells 304, the thickness of heat shield 520 may be relatively thicker. Conversely, when heat shield 520 is relatively further from cells 304, the thickness of heat shield 520 may be relatively thinner.

In examples, ejected gas and/or active material 516 and expelled coolant 518 may be directed from battery pack 200, for example, through gap 310 and out vent(s) 408. By removing ejected gas and/or active material 516 and expelled coolant 518 from battery pack 200, thermal runaway may be further mitigated. For example, by removing the ejected gas and/or active material 516, any residual energy (whether in the form of heat, chemical energy, or other) of the ejected gas and/or active material 516 will avoid impinging on other cells 304 or battery modules 202, or other electrical equipment contained within battery pack 200. Additionally or alternatively, by removing expelled coolant 518 from battery pack 200, any conductivity contained in expelled coolant 518 either originally, or acquired though interacting with ejected gas and/or active material 516 and/or other components of battery pack 200, will avoid shorting or bridging electrical connections in battery pack 200 if expelled coolant 518 would otherwise be allowed to pool within battery pack 200.

In some examples, cells 304 may be separated from one another by an insulating material 522. In some examples, the insulating material 522 may comprise an insulating foam (e.g., silicone foam, silicone potting, etc.). In some examples, insulating material 522 disposed between cells may substantially fill an interstitial space between the cells and may mitigate effects of thermal runaway of a single cell by isolating the cell from other cells proximate thereto. In such examples, the insulating material 522 may enhance thermal runaway mitigation techniques by thermally isolating the cells from one another. In examples, the insulating material 522 works with heat shield 520 to provide thermal protection to cells 304 by creating an insulating barrier.

Reinforcement plate 514 may be configured provide structural support to battery module 202, may provide protection to cooling plate 510, and/or provide insulation to battery module 202. In examples, reinforcement plate 514 may be configured to be thermally transparent during a thermal runaway. In examples, reinforcement plate 514 may be configured to form thermal runaway mitigation regions.

In some examples, such as where a battery module is offset from another battery module 202 or where a battery module is not below another battery module 202 (e.g., at the top of a stack of battery modules), a cooling element may be extended above the cells of the battery module below. Additionally or alternatively, in some examples, an auxiliary cooling element may be selectively attached to the battery module 202 to cover the area not below another battery module. Additionally or alternatively, in some examples, an auxiliary cooling element may be selectively attached to the casing 204 to cover the area not below another battery module.

Figure 6B:
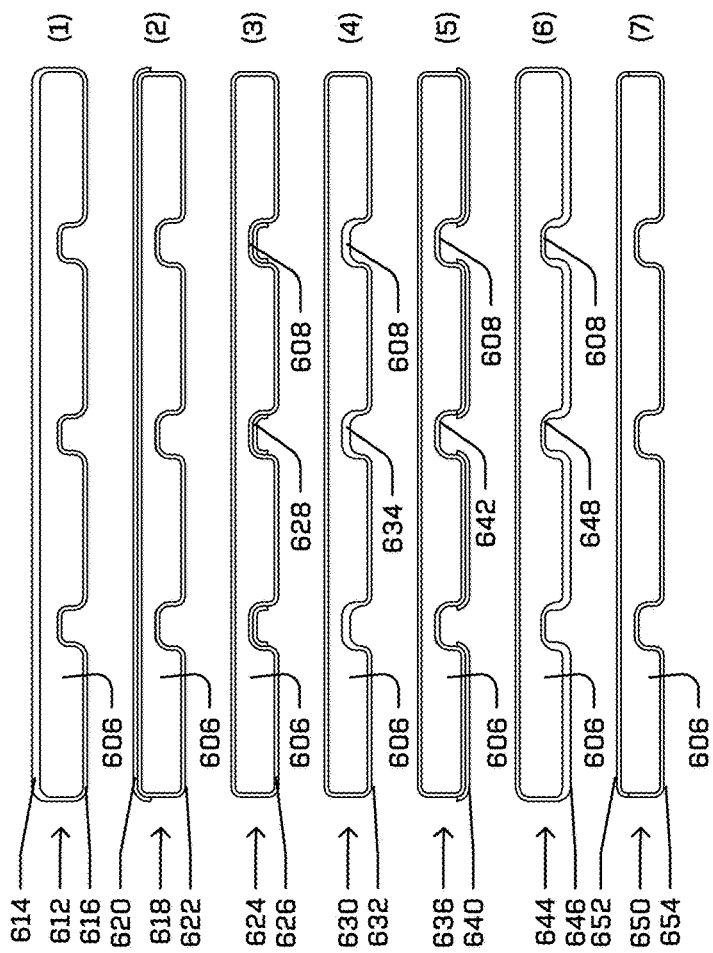
FIGS. 6A-6C are illustrations of example battery module cooling plates with cooling channels.
Figure 6C:
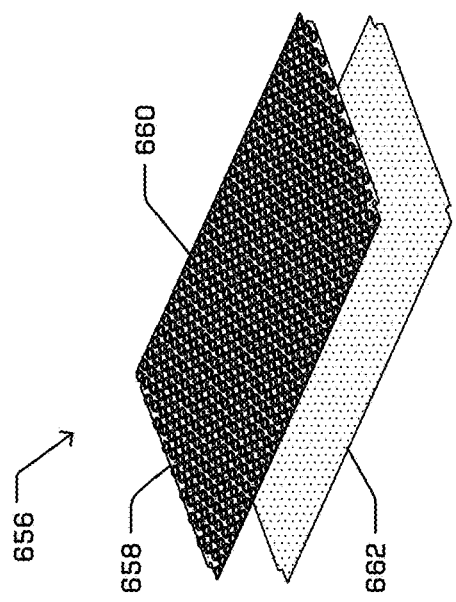
Figure 6A:
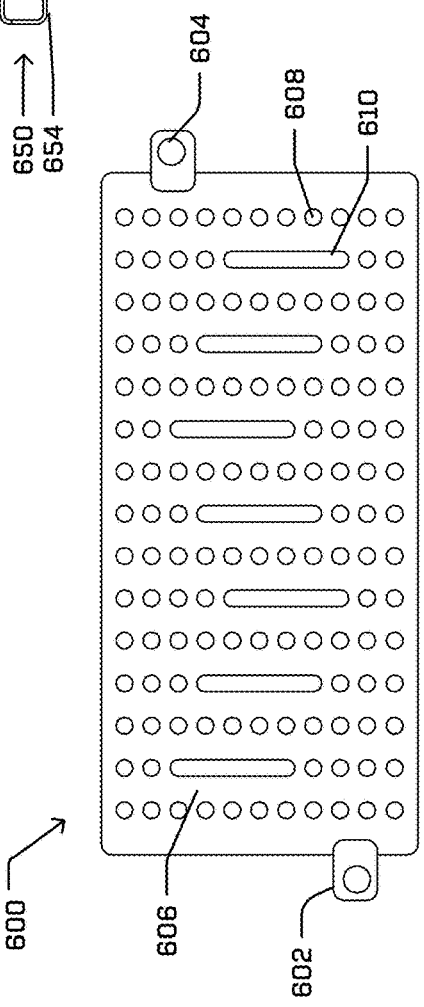

FIGS. 6A-6C show views of example cooling plates. FIG. 6A shows a bottom view of an illustrative cooling plate 600. Cooling plate 600 may have an inlet 602 configured to receive coolant and an outlet 604 configured to return coolant to a cooling system. Cooling plate 600 may also have cooling channels 606 that may be formed by structures 608 and structures 610. Cooling plate 600 may have thermal runaway mitigation regions. These thermal runaway mitigation regions may be configured to trigger during a thermal runaway event, for example, when gas or active material meet or exceed a threshold energy level. The trigger may cause the release of coolant from the cooling channels. In examples, the release may be in the form of breaching a surface of the cooling plate, for example, at a thermal runaway mitigation region. The thermal runaway mitigation regions may be tailored to respond a trigger to deliver coolant to the desired area to mitigate the thermal runaway. For example, the thermal runaway mitigation regions may be configured to only cause a breach when a thermal runaway reaches a threshold energy level, and may be configured to create a sufficiently sized breach to expel enough coolant to mitigate the thermal runaway, and maintain sufficient structure to continue to direct the coolant to the desired area.

In some examples, thermal runaway mitigation regions may be located at various localized locations on the cooling plate and may be formed through various techniques. The following are some examples of configurations and techniques usable to create and configure the thermal runaway mitigation regions.

FIG. 6B shows cutaway views (1)-(7) of illustrative cooling plate cross sections with illustrative thermal runaway mitigation regions. For example, cutaway view (1) shows a cooling plate 612 with a thicker upper surface 614 when compare to lower surface 616. In this example, if the upper and lower surfaces are made from a common material, or a material with similar thermal properties, the triggering event would cause lower surface 616 to breach before upper surface 614 thereby protecting the cells above upper surface 614. In this example, thermal runaway mitigation regions may span lower surface 616.

Cutaway view (2) shows a cooling plate 618 with a thicker upper surface 620 when compare to lower surface 622. In this example, if the upper and lower surfaces are made from a common material, or a material with similar thermal properties, the triggering event would cause lower surface 622 to breach before upper surface 620 thereby protecting the cells above upper surface 620. In this example, upper surface 620 is created by laminating another layer of the same or different material to form the thicker section. In this example, thermal runaway mitigation regions may span lower surface 622.

Cutaway view (3) shows a cooling plate 624 with cooling channels 606 formed by structures 608. In this example, lower surface 626 is thinner at regions away from structures 608 while lower surface 626 is thicker at structures 608, for example, by the added thickness of layer 628. In this example, thermal runaway mitigation regions may span lower surface 626 at the regions away from structures 608.

Cutaway view (4) shows a cooling plate 630 with cooling channels 606 formed by structures 608. In this example, lower surface 632 is thinner at regions away from structures 608 while lower surface 632 is thicker at structures 608, for example, by the increased thickness 634. In this example, thermal runaway mitigation regions may span lower surface 632 at the regions away from structures 608. In this example, the thickness difference between lower surface 632 and increased thickness 634 may be created through various techniques, including, for example, through hydroforming, welding, additive manufacturing, or other material deposition techniques.

Cutaway view (5) shows a cooling plate 636 with cooling channels 606 formed by structures 608. In this example, lower surface 640 is thicker at regions away from structures 608 while lower surface 642 is thinner at structures 608. In this example, thermal runaway mitigation regions may span lower surface 642 at structures 608. In this example, the thickness difference between lower surface 640 and at 642 may be created through various techniques, including, for example, laminating a layer of the same or different material over the bottom of cooling plate 636. In this example, material at locations corresponding to structures 608 is removed from the laminating sheet before or after laminating. In this example, the laminating sheet may include holes or voids in the sheet that correspond to the structures 608.

Cutaway view (6) shows a cooling plate 644 with cooling channels 606 formed by structures 608. In this example, lower surface 646 is thicker at regions away from structures 608 while lower surface 648 is thinner at structures 608. In this example, thermal runaway mitigation regions may span lower surface 646 at structures 608. In this example, the thickness difference between lower surface 646 and at 648 may be created through various techniques, including, for example, through hydroforming, welding, additive manufacturing, or other material deposition techniques.

Cutaway view (7) shows a cooling plate 650 with cooling channels 606 formed by structures 608 between an upper surface 652 and lower surface 654. In this example, lower surface 654 is made of a different material than upper surface 652. In some examples, upper surface 652 may be made from a first material and lower surface 654 may be made from a second material, where for example, the second material may have a lower melting point than the first material. In this example, thermal runaway mitigation regions may span lower surface 654. In some examples, the first material may be a steel or steel alloy, while the second material may be aluminum or an aluminum alloy.

FIG. 6C shows a perspective view of an illustrative thermal runaway mitigation region formation 656. For example, layer 658 containing one or more surface features 660, may be laminated to a solid layer 662. In this example, layer 658 may include a plurality of features 660 where the features 660 may be voids, holes, apertures, fissures, openings, split, slit, rift, cut, cleft, discontinuity, or thinned areas. Features 660 may be dispersed across layer 658 in a uniform or random pattern. In examples, features 660 may be located on layer 658 to correspond with cells contained in a battery module or features on a cooling plate, such as structures 608 or structures 610. In examples, features 660 may be located on layer 658 to correspond to the inverse of cells contained in a battery module or features on a cooling plate, such as structures 608 or structures 610.

Figure 7:
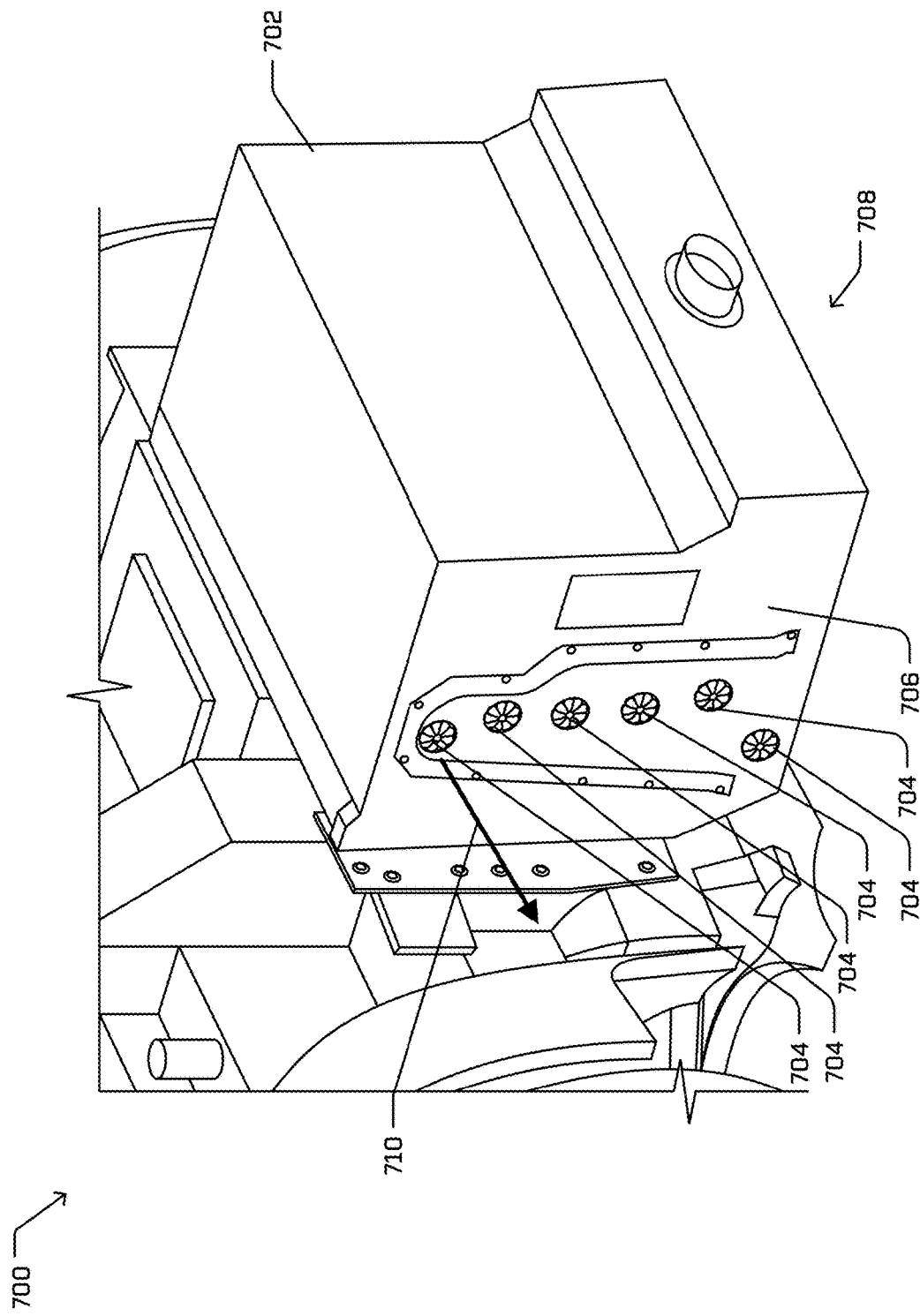
FIG. 7 is an illustration of an example battery pack configured with a plurality of exhaust vents, in accordance with embodiments of the disclosure.

FIG. 7 shows a portion of an illustrative autonomous vehicle 700 with battery pack 702 visible. In this illustrative example, battery pack 702 includes six battery modules (not shown). Battery pack 702 may also include vents 704 on a side 706 of casing 708. In examples, vents 704 may be configured to selectively open to allow pressure inside battery pack 702 to equalize, for example to atmospheric pressure. Additionally or alternatively, examples include vents 704 selectively opening to allow gas, active material, and/or coolant to exit battery pack 702 through one or more of vents 704 during a thermal runaway event. In this illustrative configuration, gas, active material, and/or coolant may exit vent 704 in direction 710 with significant energy that could cause damage to people and/or structures located in its path.

Figure 8:
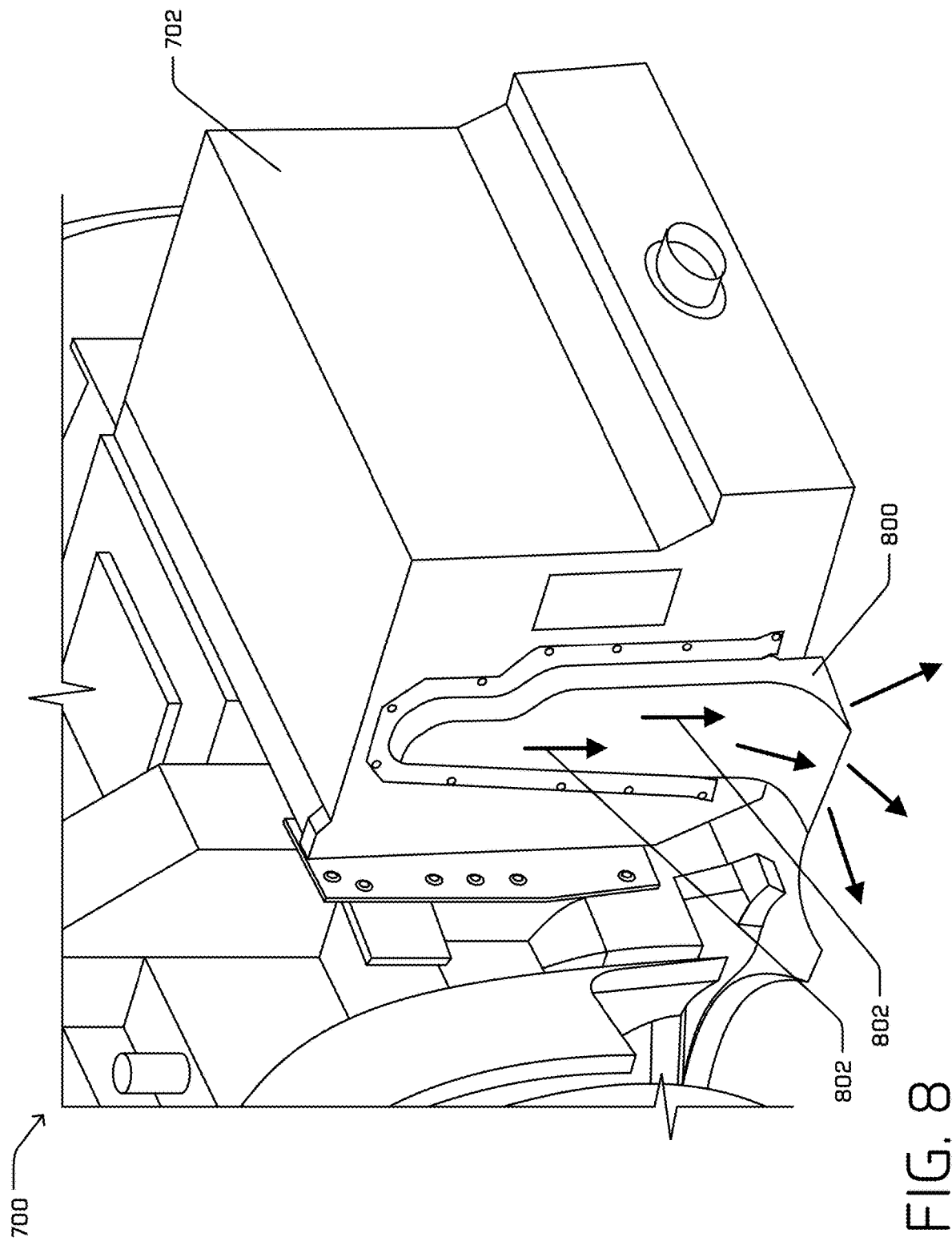
FIG. 8 is an illustration of an example battery pack configured with a heat shield, in accordance with embodiments of the disclosure.

FIG. 8 shows autonomous vehicle 700 with battery pack 702 fitted with heat shield 800. In this illustrative example, heat shield 800 may direct gas, active material, and/or coolant passing through vents 704 in direction 802. In examples, heat shield 800 may form a baffle. This may cause a change in direction of the gas, active material, and/or coolant and may reduce the overall energy thereof and/or direct the gas, active material, and/or coolant in a safer direction when compare to direction 710.

Example Methods and Processes

Figure 9:
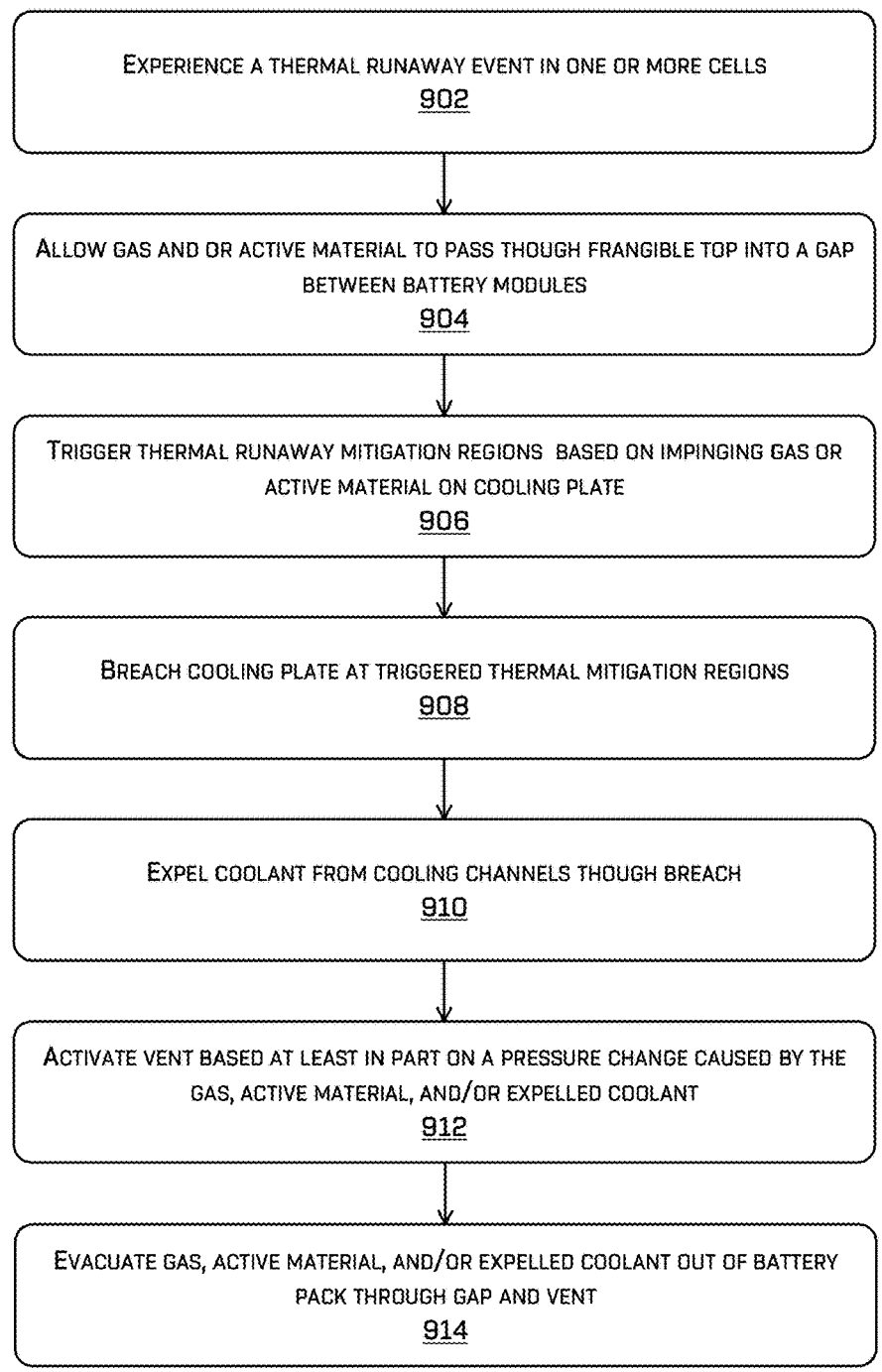
FIG. 9 depicts an example process for mitigating a thermal runaway event in a battery pack.
Figure 10:
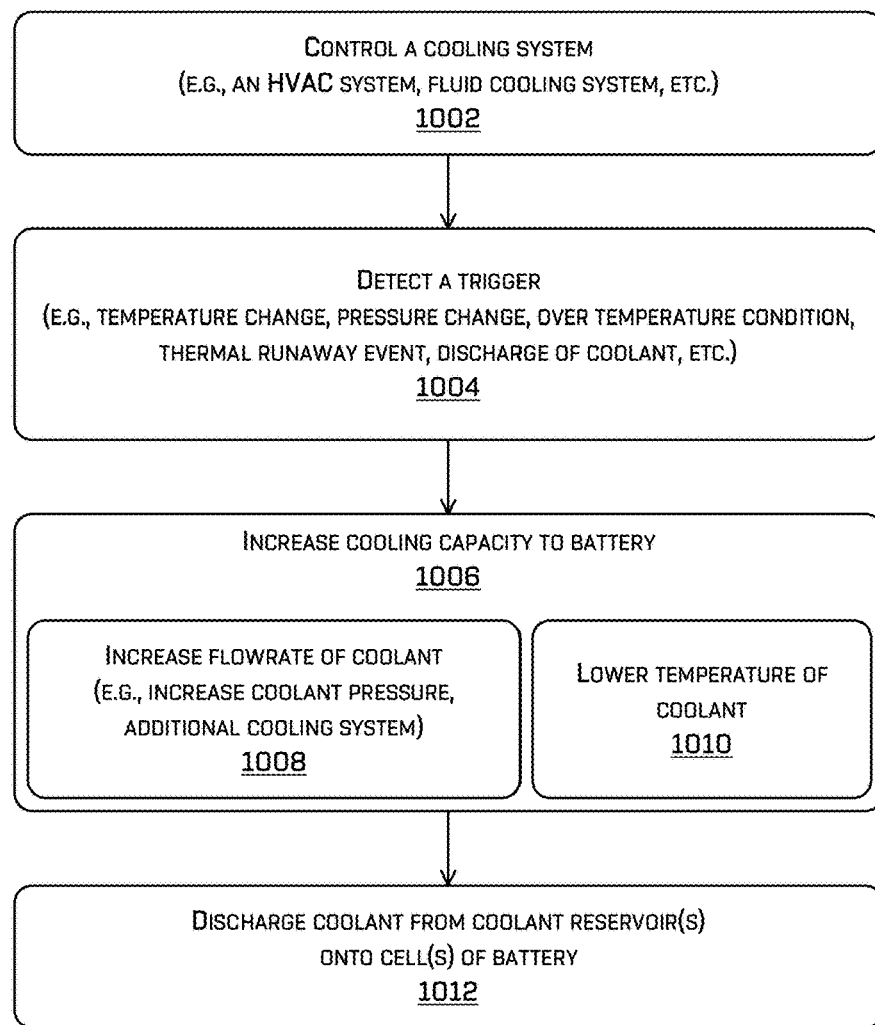
FIG. 10 depicts an example process for mitigating a thermal runaway event in a battery pack.

FIGS. 9-10 are flowcharts showing example methods and processes involving vehicles having batteries and cooling systems. The methods illustrated in FIGS. 9-10 are described with reference to one or more of the vehicles, batteries, and/or systems shown in FIGS. 1-8 for convenience and ease of understanding. However, the methods and processes illustrated in FIGS. 9-10 are not limited to being performed using the vehicles, batteries, and/or systems shown in FIGS. 1-8, and may be implemented using any of the other vehicles, batteries, and/or systems described in this application, as well vehicles, batteries, and/or systems other than those described herein. Moreover, the vehicles, batteries, and/or systems described herein are not limited to performing the methods and processes illustrated in FIGS. 9-10.

FIG. 9 depicts an example process 900 of mitigating a thermal runaway event. At operation 902, a battery pack, experiences a thermal runaway event in one or more cells of one or more battery modules.

At operation 904, the battery model containing the cells experiencing the thermal runaway event allows gas and/or active material to pass through a frangible top of the battery module. The gas and/or active material passes into a gap between the battery module experiencing the thermal runaway event and a battery module directly above.

At operation 906, the thermal runaway event triggers thermal runaway mitigation regions based on gas and/or active material impinging on a surface of cooling plate. For example, if the gas and/or active material exceeds an energy threshold, the impingement will trigger the thermal runaway mitigation regions.

At operation 908, the triggered thermal runaway mitigation regions breach the cooling exposing coolant from cooling channels of the cooling plate.

At operation 910, the triggered thermal mitigation regions expel coolant from cooling channels though breach toward the gas and/or active material and/or cells experiencing thermal runaway. For example, the expelled coolant may mix with the gas and/or active coolant to reduce the temperature and/or kinetic energy of the gas and/or active material.

At operation 912, the gas, active material, and/or coolant activate one or more vents based at least in part on a pressure change caused by the gas, active material, and/or expelled coolant. For example, gas and/or active material released from a cell during a thermal runaway event will often create an increase in pressure within the battery pack. This increase in pressure may activate the vent. In examples, coolant expelled from the cooling channels during a thermal runaway event will often create an increase in pressure within the battery pack. This increase in pressure may activate the vent.

At operation 914, the gas, active material, and/or expelled coolant evacuate battery pack through the gap between the battery modules and through the activated vent. For example, the pressure increase caused by the gas and/or active material and the pressure increase caused by the expelled coolant, may cause a flow of the gas, active material, and/or expelled coolant out of the battery pack.

FIG. 10 depicts an example process 1000 of mitigating a thermal runaway event. At operation 1002, a system, for example, vehicle, a drive module, a computer system, or combinations thereof, controls a cooling system. In examples, the cooling system comprises a heating ventilation and air conditioning system to cool a passenger compartment of a vehicle. In examples, the cooling system comprises a coolant, for example, a liquid coolant, a coolant reservoir, valves, control system, or combinations thereof.

At operation 1004, the system detects a trigger. For example, a trigger may be indicative of a thermal runaway event occurring in a cell of a battery. In examples, a thermal runaway event is experienced in one or more cells of a battery pack. In examples, the thermal runaway event may have multiple stages. For example, a cell may experience a thermal runaway event causing an internal temperature of the cell to increase to an over temperature condition. In examples, the over temperature condition may indicate that a cell will, is, and/or has expelled and/or vented gas and/or active material from the cell.

Additionally or alternatively, in examples, the trigger may include a change in temperature, a change in pressure, or a combination thereof. For example, a change in temperature may include a change in a battery temperature, a coolant temperature, or a combination thereof. In examples, the coolant temperature is measured at a coolant outlet of the battery, a coolant return of the cooling system, or a combination thereof. In examples the battery temperature is measured at an external surface of a battery module an internal surface of a battery module, an embedded location in a potting material of a battery module, an inside surface of a battery case, an outside surface of a battery casing, an internal surface of a battery casing.

In some examples, the change in temperature is above a temperature increase threshold. In some examples, the change in temperature is above a temperature increase threshold for a duration greater than a threshold temperature period. In this example, the temperature being above a temperature increase threshold for greater than a time limit may help to filter sensor noise and/or reduce false triggers.

Additionally or alternatively, in some examples, the change in pressure includes a decrease in pressure of the coolant or coolant system. In this example, a decrease in pressure may indicate that the cell has entered thermal runaway and has breached a surface of a cooling plate causing coolant to be expelled from the cooling plate and mixing with gas and/or active material vented from the cell and/or douse the cell. These interactions may mitigate the thermal runaway event.

Additionally or alternatively, in some examples, the change in pressure includes an increase in pressure. In this example, the increase in pressure may be caused by a phase change (e.g., boiling) of the coolant. In this example, the coolant may be heated by the cell causing the coolant to boil and expand. In examples, this may occur before a decrease in pressure is detected, for example, due to a breach in the cooling plate.

Additionally or alternatively, the detecting a trigger may include detecting a thermal mitigation event. For example, the thermal mitigation event may include detecting that a cooling plate has been breach and is expelling coolant on the cell experiencing a thermal runaway event, activity, and/or condition.

At operation 1006, the system increases, based at least in part on detecting the trigger, a level of cooling capacity provided to the cell. In examples, the increase of cooling includes increasing a flowrate of coolant to the cell, reducing a temperature of coolant provided to the cell, or combinations thereof.

For example, at operation 1008, the system increases a flowrate of coolant to the cell through a first cooling plate below the cell, a second cooling plate above the cell, or a combination thereof. In examples, the increased coolant flow may pull heat from the cell through the first cooling plate below the cell. In examples, the second cooling sheet may expel coolant on to or into the vicinity of the cell to mitigate the thermal runaway event. In examples, the increased flowrate may be effected by increasing the pressure of the coolant system.

Additionally or alternatively, at operation 1010, the system lowers a temperature of the coolant directed to the cell. In this example, the system may cause the coolant temperature to drop to a lower temperature and a normal coolant temperature. This lower temperature may allow the coolant to absorb additional energy when compared to the coolant at a normal coolant temperature.

Additionally or alternatively, the system may cause another cooling system, for example, a cooling system contained in a drive module separate from the battery containing the cell, to provide coolant to the cell. In this example, the other cooling system may adjust the coolant flowrate and/or coolant temperature similar to the cooling system describe above.

At operation 1012, the system may continue to provide coolant to the cell, for example, by discharging coolant. In examples, the coolant may be supplied from a coolant reservoir. In some examples, the system may discharge the coolant until the coolant reservoir is depleted. In examples, a thermal runaway event may cause the vehicle to not be suitable to transport passengers until the battery is replaced and/or repaired. In this case, it may be desirable to use the coolant available to mitigate the thermal runaway event and not reserve coolant for future operation of the HVAC system.

The methods and processes 900 and 1000 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods and processes 900 and 1000 may be combined in whole or in part with each other or with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A. A vehicle comprising: a cooling system having a coolant; and a battery system comprising: a first battery module comprising: a first plurality of energy storage cells; and a cooling element disposed below the first plurality of energy storage cells, the cooling element in fluid communication with the cooling system; and a second battery module comprising: a second plurality of energy storage cells, the second battery module being disposed below the first battery module such that a cell of the second plurality of energy storage cells is disposed below the cooling element, wherein the cooling element is configured, in response to the cell entering thermal runaway, to expel coolant onto the cell.

B. The vehicle as paragraph A recites, wherein the cooling element comprises a cooling plate, the cooling plate comprising: a first surface having a first thickness, the first surface disposed adjacent to the first plurality of energy storage cells; and a second surface having a second thickness, the second surface opposite the first surface, and the second thickness being thinner than the first thickness.

C. The vehicle as any one of paragraphs A or B recites, wherein the cooling element comprises a cooling plate, the cooling plate comprising: a first surface disposed adjacent to the first plurality of energy storage cells; and a second surface comprising a first area and a second area, the second area being thinner than the first area.

D. The vehicle as any one of paragraphs A-C recites, wherein the second surface comprises a first sheet of material bonded to a second sheet of material, the second sheet of material having a void corresponding to the second area.

E. The vehicle as any one of paragraphs A-D recites, wherein the cooling element comprises a cooling plate, the cooling plate comprising: a first surface comprising a first material, the first surface disposed adjacent to the first plurality of energy storage cells; and a second surface, including a second material, the second surface opposite the first surface, and the first material having a higher melting temperature than the second material.

F. The vehicle as any one of paragraphs A-E recites, wherein the cooling system comprises a heating ventilation and air conditioning system to cool a passenger compartment of the vehicle.

G. The vehicle as any one of paragraphs A-F recites, further comprising: a second a cooling system; and a second battery system, the second cooling system in fluid communication with the second battery system, and in fluid communication with the cooling system.

H. The vehicle as any one of paragraphs A-G recites, wherein the second battery module further comprising a heat shield disposed above the second plurality of energy storage cells, the heat shield being frangible and configured to breach in response to the cell entering thermal runaway.

I. The vehicle as any one of paragraphs A-H recites, wherein the second battery module comprises at least one of a valve or a trough to direct coolant expelled from cooling channel to exit the battery system after being expelled onto the cell.

J. A battery system comprising: a first battery module comprising: a first plurality of energy storage cells; and a cooling element disposed below the first plurality of energy storage cells, the cooling element containing coolant; and a second battery module comprising: a second plurality of energy storage cells, the second battery module being disposed below the first battery module such that a cell of the second plurality of energy storage cells is disposed below the cooling element, wherein the cooling element is configured, in response to the cell entering thermal runaway, to expel coolant onto the cell.

K. The battery system as paragraph J recites, wherein the cooling element comprises a cooling plate, the cooling plate comprising: a first surface having a first thickness, the first surface disposed adjacent to the first plurality of energy storage cells; and a second surface having a second thickness, the second surface opposite the first surface, and the second thickness being thinner than the first thickness.

L. The battery system as any one of paragraphs J or K recites, wherein the cooling element comprises a cooling plate, the cooling plate comprising: a first surface disposed adjacent to the first plurality of energy storage cells; and a second surface comprising a first area and a second area, the second area being thinner than the first area.

M. The battery system as any one of paragraphs J-L recites, wherein the second surface comprises a first sheet of material bonded to a second sheet of material, the second sheet of material having a void corresponding to the second area.

N. The battery system as any one of paragraphs J-M recites, wherein the cooling element comprises a cooling plate, the cooling plate comprising: a first surface comprising a first material, the first surface disposed adjacent to the first plurality of energy storage cells; and a second surface, including a second material, the second surface opposite the first surface, and the first material having a higher melting temperature than the second material.

O. The battery system as any one of paragraphs J-N recites, wherein the second battery module further comprises a heat shield disposed above the second plurality of energy storage cells, the heat shield being frangible and configured to breach in response to the cell entering thermal runaway.

P. The battery system as any one of paragraphs J-O recites, wherein the second battery module comprises at least one of a valve or a trough to direct coolant expelled from cooling channel to exit the battery system after being expelled onto the cell.

Q. A thermal runaway mitigation system, comprising: a plurality of energy storage cells; and a cooling element disposed above the plurality of energy storage cells such that a cell of the plurality of energy storage cells is disposed below the cooling element, the cooling element containing coolant, wherein the cooling element is configured, in response to the cell entering thermal runaway, to expel coolant onto the cell.

R. The thermal runaway mitigation system as paragraph Q recites, wherein the cooling element comprises a cooling plate, the cooling plate comprising: a first surface having a first thickness; and a second surface having a second thickness, the second surface opposite the first surface and disposed between the first surface and the cell, and the second thickness being thinner than the first thickness. The thermal runaway mitigation system of claim 17, wherein the cooling element comprises a cooling plate, the cooling plate comprising: a first surface; and a second surface, the second surface opposite the first surface and between the first surface and the cell, the second surface comprising a first area and a second area, the second area being thinner than the first area.

S. The thermal runaway mitigation system as any one of paragraphs Q or R recites, wherein the cooling element comprises a cooling plate, the cooling plate comprising: a first surface comprising a first material; and a second surface including a second material, the second surface opposite the first surface and disposed between the first surface and the cell, and the first material having a higher melting temperature than the second material.

T. A battery architecture comprising cooling plates configured to fail at localized regions above a cell that has entered thermal runaway in order direct coolant onto the failed cell to quench the failed cell and prevent it from causing other nearby cells from entering thermal runaway and starting a chain reaction.

U. A battery architecture comprising a heat shield disposed above a battery module and configured to break at a localized region above each cell, and in the event that a cell enters thermal runaway, hot gas and/or active material ejected from the cell break through the heat shield and are directed into a space between the heat shield and a cooling plate and away from other adjacent cells.

V. A battery system comprising: a first battery module comprising: a first module housing including a bottom surface; and a first plurality of energy storage cells disposed in the housing; and a second battery module disposed below the first battery module, the second battery module comprising: a second module housing; a second plurality of energy storage cells disposed in the second module housing; and a heat shield disposed in the second module housing above the second plurality of energy storage cells, at least a portion of the heat shield disposed above a cell of the second plurality of energy storage cells and configured to break in response to material exhausted from the cell to vent the material from the cell into a space between the first module housing and the second module housing.

W. The battery system as paragraph V recites, the heat shield comprising a thermal runaway mitigation feature comprising at least one of a region of the heat shield that is weaker than another region of the heat shield, or region of the heat shield that is thinner than another region of the heat shield.

X. The battery system as any one of paragraphs V or W recites, the heat shield comprising a thermal runaway mitigation feature, the heat shield comprising: a first layer having an aperture; and a second layer laminated to the first layer, the aperture of the first layer defining the thermal runaway mitigation feature.

Y. The battery system as any one of paragraphs V-X recites, further comprising a casing including a valve configured to open in response to an increase in pressure in the casing caused by the cell exhausting material into the casing to vent the material from the casing.

Z. The battery system as any one of paragraphs V-Y recites, the heat shield comprising a frangible material that, when breached during the thermal runaway event, shields the second plurality of energy storage cells from heat of the material exhausted from the cell.

AA. The battery system as any one of paragraphs V-Z recites, wherein the frangible material comprising mica, phlogopite, muscovite, ceramic, or a combination thereof.

BB. The battery system as any one of paragraphs V-AA recites, further comprising a battery pack casing at least partially enclosing the first module housing and the second module housing, the battery pack casing comprising an exhaust vent and an exhaust shield disposed over the exhaust vent to direct the material exhausted from the cell away from a passenger compartment of a vehicle.

CC. The battery system as any one of paragraphs V-BB recites, wherein one or more of the heat shield has a thickness of at least about 1 mm and at most about 3 mm, or the heat shield is spaced at most about 5 mm millimeters above a top surface of the second plurality of energy storage cells.

DD. A battery module comprising: a module housing, the module housing comprising one or more supports protruding from the module housing to couple the module housing to a casing of a battery pack; a plurality of energy storage cells disposed in the module housing; and a heat shield disposed in the module housing above the plurality of energy storage cells, at least a portion of the heat shield disposed above a cell of the plurality of energy storage cells and configured to break in response to material exhausted from the cell to vent the material from the cell into a battery module bay bounded at least in part by the supports protruding from the module housing.

EE. The battery module as paragraph DD recites, the heat shield comprising a thermal runaway mitigation feature comprising at least one of a region of the heat shield that is weaker than another region of the heat shield, or region of the heat shield that is thinner than another region of the heat shield.

FF. The battery module as any one of paragraphs DD or EE recites, the heat shield comprising a thermal runaway mitigation feature, the heat shield comprising: a first layer of a material containing a hole; and a second layer of the material laminated to the first layer, the hole of the first layer defining the thermal runaway mitigation feature.

GG. The battery module as any one of paragraphs DD-FF recites, the heat shield comprising a frangible material that, when breached during the thermal runaway event, shields the plurality of energy storage cells from heat of the material exhausted from the cell, the frangible material comprising mica, phlogopite, muscovite, ceramic, or a combination thereof.

HH. The battery module as any one of paragraphs DD-GG recites, wherein the battery module is a first battery module and the battery module bay is a first battery module bay, and the supports protruding from the module housing restrict passage of air between the first battery module bay and a second battery module bay associated with a second battery module disposed above or below the first battery module, thereby thermally insulating the first battery module bay from the second battery module bay.

II. A battery pack comprising: a first battery module comprising a first plurality of energy storage cells; and a second battery module disposed below the first battery module, the second battery module comprising: a second plurality of energy storage cells; and a heat shield disposed above the second plurality of energy storage cells, the heat shield including a thermal runaway mitigation feature disposed above a cell of the second plurality of energy storage cells and configured to break in response to material exhausted from the cell to vent the material from the cell into a space between the first module and the second module.

JJ. The battery pack as paragraph II recites, the thermal runaway mitigation feature comprising at least one of a region of the heat shield that is weaker than another region of the heat shield, or region of the heat shield that is thinner than another region of the heat shield.

KK. The battery pack as any one of paragraphs II or JJ recites, the heat shield comprising: a first layer having an aperture; and a second layer laminated to the first layer, the aperture of the first layer defining the thermal runaway mitigation feature.

LL. The battery pack as any one of paragraphs II-KK recites, the second battery module including a valve configured to open in response to the cell exhausting material to vent the material from the second battery module.

MM. The battery pack as any one of paragraphs II-LL recites, wherein one or more of the heat shield has a thickness of at least about 1 mm and at most about 3 mm, or the heat shield is spaced at most about 5 mm millimeters above a top surface of the second plurality of energy storage cells.

NN. The battery pack as any one of paragraphs II-MM recites, wherein the frangible material comprising mica, phlogopite, muscovite, ceramic, or a combination thereof.

OO. The battery pack as any one of paragraphs II-NN recites, further comprising a battery pack casing at least partially enclosing the first battery module and the second battery module, the battery pack casing comprising an exhaust vent and an exhaust shield disposed over the exhaust vent to direct the material exhausted from the cell away from a passenger compartment of a vehicle.

PP. A cooling system architecture comprising sensors, cooling elements, and controls configured to detect a trigger indicating that a cell that has entered thermal runaway and respond by cooling coolant to a lower temperature and/or provide additional coolant to the battery containing the failed cell to prevent it from causing other nearby cells from entering thermal runaway and starting a chain reaction.

QQ. A vehicle comprising: a cooling system having a coolant, the cooling system comprising a heating ventilation and air conditioning system to cool a passenger compartment of the vehicle; a battery comprising a cell for storing energy; and a computer system comprising: one or more processors; and memory storing one or more computer-executable instructions that are executable by the one or more processors to perform operations comprising: controlling the cooling system to cool the battery of the vehicle; detecting a trigger associated with a discharge of coolant from the cooling system to mitigate a thermal runaway event in a cell of the battery of the vehicle; and increasing, based at least in part on detecting the trigger, a level of cooling capacity provided to the cell.

RR. The vehicle as paragraph QQ recites, wherein the increasing the level of cooling comprises at least one of increasing a flowrate of coolant to the battery or reducing a temperature of coolant provided to the battery.

SS. The vehicle as any one of paragraphs QQ or RR recites, wherein the increasing the level of cooling comprises increasing a flowrate of coolant to at least one of a first cooling plate below the cell or a second cooling plate above the cell.

TT. The vehicle as any one of paragraphs QQ-SS recites, wherein the increasing the level of cooling comprises reducing a temperature of coolant provided to at least one of a first cooling plate below the cell or a second cooling plate above the cell.

UU. The vehicle as any one of paragraphs QQ-TT recites, further comprising another cooling system, wherein the increasing the level of cooling comprises directing coolant from the other cooling system to the battery.

VV. The vehicle as any one of paragraphs QQ-UU recites, wherein the trigger comprises at least one of a change in temperature or a change in pressure of at least a portion of the cooling system.

WW. The vehicle as any one of paragraphs QQ-VV recites, wherein the trigger comprises at least one of a change in temperature or a change in pressure of at least a portion of the battery.

XX. The vehicle as any one of paragraphs QQ-WW recites, wherein detecting a trigger includes detecting a discharge of coolant to a cell of the battery.

YY. A method comprising: controlling a cooling system to provide coolant to cool a battery of a vehicle; detecting a trigger associated with a discharge of coolant from the cooling system to mitigate an over temperature condition of the battery of the vehicle; and increasing, based at least in part on detecting the trigger, a level of cooling capacity provided to the battery by the coolant.

ZZ. The method as paragraph YY recites, wherein the increasing the level of cooling capacity comprises at least one of increasing a flowrate of the coolant to the battery or reducing a temperature of the coolant provided to the battery.

AAA. The method as any one of paragraphs YY or ZZ recites, wherein the increasing the level of cooling capacity comprises increasing a flowrate of coolant to at least one of a first cooling plate below a cell of the battery or a second cooling plate above the cell of the battery.

BBB. The method as any one of paragraphs YY-AAA recites, wherein the increasing the level of cooling capacity comprises reducing a temperature of coolant provided to at least one of a first cooling plate below a cell of the battery or a second cooling plate above the cell of the battery.

CCC. The method as any one of paragraphs YY-BBB recites, wherein the increasing the level of cooling capacity comprises directing coolant from another cooling system to the battery.

DDD. The method as any one of paragraphs YY-CCC recites, wherein the trigger comprises at least one of a change in temperature or a change in pressure of at least a portion of the cooling system.

EEE. The method as any one of paragraphs YY-DDD recites, wherein the trigger comprises at least one of a change in temperature or a change in pressure of at least a portion of the of the battery.

FFF. The method as any one of paragraphs YY-EEE recites, wherein detecting a trigger includes detecting a discharge of coolant to a cell of the battery.

GGG. One or more non-transitory computer-readable media storing instructions configured for execution by one or more processors of a computing system to perform actions comprising: controlling a cooling system to provide coolant to cool a battery of a vehicle; detecting a trigger associated with a discharge of coolant from the cooling system to mitigate an over temperature condition of the battery of the vehicle; and increasing, based at least in part on detecting the trigger, a level of cooling capacity provided to the battery by the coolant.

HHH. The one or more non-transitory computer-readable media as paragraph GGG recites, wherein the increasing the level of cooling capacity comprises at least one of increasing a flowrate of coolant to the battery or reducing a temperature of coolant provided to the battery.

III. The one or more non-transitory computer-readable media as any one of paragraphs GGG or HHH recites, wherein the increasing the level of cooling capacity comprises directing coolant from another cooling system to the battery.

JJJ. The one or more non-transitory computer-readable media as any one of paragraphs GGG-III recites, wherein the trigger comprises at least one of a change in temperature or a change in pressure of at least a portion of the cooling system or at least a portion of the battery.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
    a cooling system having a coolant; and
    a battery system comprising:
        a first battery module comprising:
            a first plurality of energy storage cells; and
            a cooling element disposed below the first plurality of energy storage cells, the cooling element in fluid communication with the cooling system; and
        a second battery module comprising:
            a second plurality of energy storage cells, the second battery module being disposed below the first battery module such that a cell of the second plurality of energy storage cells is disposed below the cooling element,
        wherein the cooling element is a cooling plate configured, in response to the cell entering thermal runaway, to expel coolant onto the cell.

2. The vehicle of claim 1, wherein the cooling plate comprises:
    a first surface having a first thickness, the first surface disposed adjacent to the first plurality of energy storage cells; and
    a second surface having a second thickness, the second surface opposite the first surface, and the second thickness being thinner than the first thickness.

3. The vehicle of claim 1, wherein the cooling plate comprises:
    a first surface disposed adjacent to the first plurality of energy storage cells; and
    a second surface comprising a first area and a second area, the second area being thinner than the first area.

4. The vehicle of claim 3, wherein the second surface comprises a first sheet of material bonded to a second sheet of material, the second sheet of material having a void corresponding to the second area.

5. The vehicle of claim 1, wherein the cooling plate comprises:
a first surface comprising a first material, the first surface disposed adjacent to the first plurality of energy storage cells; and
a second surface, including a second material, the second surface opposite the first surface, and the first material having a higher melting temperature than the second material.

6. The vehicle of claim 1, wherein the cooling system comprises a heating ventilation and air conditioning system to cool a passenger compartment of the vehicle.

7. The vehicle of claim 1, further comprising:
a second cooling system; and
a second battery system, the second cooling system in fluid communication with the second battery system, and in fluid communication with the cooling system.

8. The vehicle of claim 1, wherein the second battery module further comprising a heat shield disposed above the second plurality of energy storage cells, the heat shield being frangible and configured to breach in response to the cell entering thermal runaway.

9. The vehicle of claim 1, wherein the second battery module comprises at least one of a valve or a trough to direct coolant expelled from the cooling element to exit the battery system after being expelled onto the cell.

10. A battery system comprising:
a first battery module comprising:
a first plurality of energy storage cells; and
a cooling element disposed below the first plurality of energy storage cells, the cooling element containing coolant; and
a second battery module comprising:
a second plurality of energy storage cells, the second battery module being disposed below the first battery module such that a cell of the second plurality of energy storage cells is disposed below the cooling element,
wherein the cooling element is a cooling plate configured, in response to the cell entering thermal runaway, to expel coolant onto the cell.

11. The battery system of claim 10, wherein the cooling plate comprises:
a first surface having a first thickness, the first surface disposed adjacent to the first plurality of energy storage cells; and
a second surface having a second thickness, the second surface opposite the first surface, and the second thickness being thinner than the first thickness.

12. The battery system of claim 10, wherein the cooling plate comprises:
a first surface disposed adjacent to the first plurality of energy storage cells; and
a second surface comprising a first area and a second area, the second area being thinner than the first area.

13. The battery system of claim 12, wherein the second surface comprises a first sheet of material bonded to a second sheet of material, the second sheet of material having a void corresponding to the second area.

14. The battery system of claim 10, wherein the cooling plate comprises:
a first surface comprising a first material, the first surface disposed adjacent to the first plurality of energy storage cells; and
a second surface, including a second material, the second surface opposite the first surface, and the first material having a higher melting temperature than the second material.

15. The battery system of claim 10, wherein the second battery module further comprises a heat shield disposed above the second plurality of energy storage cells, the heat shield being frangible and configured to breach in response to the cell entering thermal runaway.

16. The battery system of claim 10, wherein the second battery module comprises at least one of a valve or a trough to direct coolant expelled from the cooling element to exit the battery system after being expelled onto the cell.

17. A thermal runaway mitigation system, comprising:
a plurality of energy storage cells; and
a cooling element disposed above the plurality of energy storage cells such that a cell of the plurality of energy storage cells is disposed below the cooling element, the cooling element containing coolant,
wherein the cooling element is a cooling plate configured, in response to the cell entering thermal runaway, to expel coolant onto the cell.

18. The thermal runaway mitigation system of claim 17, wherein the cooling plate comprises:
a first surface having a first thickness; and
a second surface having a second thickness, the second surface opposite the first surface and disposed between the first surface and the cell, and the second thickness being thinner than the first thickness.

19. The thermal runaway mitigation system of claim 17, wherein the cooling plate comprises:
a first surface; and
a second surface, the second surface opposite the first surface and between the first surface and the cell, the second surface comprising a first area and a second area, the second area being thinner than the first area.

20. The thermal runaway mitigation system of claim 17, wherein the cooling plate comprises:
a first surface comprising a first material; and
a second surface including a second material, the second surface opposite the first surface and disposed between the first surface and the cell, and the first material having a higher melting temperature than the second material.

* * * * *